(12) United States Patent
Mergard et al.

(10) Patent No.: US 6,415,348 B1
(45) Date of Patent: Jul. 2, 2002

(54) FLEXIBLE MICROCONTROLLER ARCHITECTURE

(75) Inventors: James O. Mergard, Pflugerville; James R. Magro, Austin; Michael S. Quimby, Austin; Pratik M. Mehta, Austin, all of TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/379,457

(22) Filed: Aug. 23, 1999

(51) Int. Cl.[7] .............................................. G06F 13/38

(52) U.S. Cl. ........................ 710/305; 710/309; 710/315

(58) Field of Search .................................. 710/305–315

(56) References Cited

U.S. PATENT DOCUMENTS

| | | | | |
|---|---|---|---|---|
| 5,603,051 A | * | 2/1997 | Ezzet ............................ | 710/2 |
| 6,167,365 A | * | 12/2000 | Karthikeyan et al. ......... | 703/28 |
| 6,176,425 B1 | * | 1/2001 | Harrison et al. ............. | 235/385 |
| 6,260,098 B1 | * | 7/2001 | Ku .............................. | 710/130 |

OTHER PUBLICATIONS

*ÉLAN™ SC400 and Élan SC410 Single–Chip Low–Power PC/AT–Compatible Microcontrollers*, Data Sheet, Advanced Micro Devices, Inc., Dec. 1998, pp. 1 through 132.
*The Élan™ SC410 Microcontroller*, Product Brief, Advanced Micro Devices, Inc., ©1999, 3 pages, http://www.amd.com/products/lpd/elan410/21328a.html.
*AMD Chipset Product Overview: AMD–640™ Chipset*, Advanced Micro Devices, Inc., ©1999, 5 pages, http://www.amd.com/products/cpg/chipset.21343a.html.
*The E86 Family: AMD's x 86 Embedded Solutions*, Advanced Micro Devices, Inc., 12 pages.
*AM186™ CC High–Performance, 80C186–Compatible 16–Bit Embedded Communications Controller*, Data Sheet, Advanced Micro Devices, Inc., Jun. 1998, pp. 1 through 100.
*80960CA–33,–25,–16–, 32–Bit High–Performance Embedded Processor*, ©Intel Corporation, 1993, table of contents and pp. 1 through 46.

* cited by examiner

Primary Examiner—Rupal Dharia
(74) Attorney, Agent, or Firm—Akin, Gump, Strauss, Hauer & Feld LLP

(57) ABSTRACT

A microcontroller provides a flexible architecture to readily support both general embedded applications and communications applications. The microcontroller includes an embedded processor, a relatively low-speed general purpose peripheral bus controller, a relatively high-speed peripheral bus host bridge, a primary memory controller, and a secondary memory controller, each coupled to a processor bus. The general purpose peripheral bus controller is coupled to a relatively low-speed general purpose peripheral bus which is coupled to a plurality of integrated general purpose peripherals. The relatively high-speed peripheral bus host bridge is coupled to a relatively high-speed peripheral bus capable of supporting a plurality of communication-oriented peripherals. The secondary memory controller shares an address bus with the general purpose peripheral bus controller and shares a data bus with either the primary memory controller or the general purpose peripheral bus controller. The control timing of the secondary memory controller is independent of the control timing of the general purpose peripheral bus controller. Also, a processor arbiter is coupled to the embedded processor, and a relatively high-speed peripheral bus arbiter is coupled to the peripheral bus host bridge. Aside from the microcontroller, an embedded system can include a relatively low-speed general purpose peripheral bus and a relatively high-speed peripheral bus, both external to the microcontroller. The external relatively low-speed general purpose bus can be coupled to the relatively low-speed general purpose peripheral bus controller, and the external relatively high-speed peripheral bus can be coupled to the relatively high-speed peripheral bus host bridge.

20 Claims, 14 Drawing Sheets

FLEXIBLE MICROCONTROLLER ARCHITECTURE

BACKGROUND OF THE INVENTION

1. Field of the Invention

The present invention generally relates to microcontroller architectures, and more particularly to a flexible microcontroller architecture for supporting both general embedded applications and communications applications.

2. Description of the Related Art

To achieve superior integrated communications solutions, microcontrollers have recently been designed to target communications applications. Microcontrollers directed to communications applications commonly integrate a universal serial bug (USB) controller and a High-Level Data Link Control (HDLC) controller. An HDLC controller provides support for a number of communication protocols such as HDLC, SDLC, Link Access Procedures Balanced (LAPB), Link Access Procedures on the D-channel (LAPD), and PPP. The channels of an HDLC controller can be selectively coupled to a pulse code modulation (PCM) highway, a general circuit interface (GCI), an ISDN-oriented modular interface revision 2 (IOM-2) serial bus, a data carrier equipment (DCE) serial interface, and other general and specific interfaces that often use packetized communication. A microcontroller supporting an HDLC controller and USB controller can be used for a broad range of communications applications, including ISDN terminal adapters, low-end routers, digital subscriber line (DSL) modems, USB peripherals, PBX applications, digital phones, digital loop carriers, and key telephone systems.

Some communications microcontrollers have also been designed to target a specific communications application. For example, a microcontroller providing a USB peripheral controller, but not an HDLC controller, has been designed to support communications-oriented peripherals typically found in a computer system environment, such as a DSL modem, for example. As another example, a microcontroller providing an HDLC controller, but not a USB peripheral controller, has been designed for cost-sensitive telecom applications such as linecards and digital phones.

Certain other microcontrollers (which might be termed "general microcontrollers") integrate system peripherals to serve the common requirements of embedded products in general, such as those in office automation, mass storage, and the communications market. Some specific embedded applications, for example, include disk drives, hand-held and desktop terminals, set-top controllers, fax machines, printers, photocopiers, feature phones, cellular phones, PBXs, multiplexers, modems and industrial controls. The system peripherals in microcontrollers targeting these types of applications have included an interrupt control unit, a timer control unit, a direct memory access (DMA) unit, a bus interface unit ( BIU), a chip select unit, asynchronous serial ports, and an execution unit. This variety of microcontrollers has serviced control applications, communication applications, and other embedded applications. However, compared to communications microcontrollers, general microcontrollers have not integrated communications-oriented controllers, such as an HDLC controller or a USB controller, which are gaining importance for communications applications. Compared to general microcontrollers, communications microcontrollers either lack the capability or provide a limited capability to support peripherals suitable for other embedded areas.

Both general microcontrollers and communications microcontrollers have lacked the architectural flexibility to effectively serve both the general embedded market and the communications market.

SUMMARY OF THE INVENTION

Briefly, a microcontroller provides a flexible architecture to readily support both general embedded applications and communications applications. The microcontroller includes an embedded processor, a relatively low-speed general purpose peripheral bus controller, a relatively high-speed peripheral bus host bridge, a primary memory controller, and a secondary memory controller, each coupled to a processor bus. The general purpose peripheral bus controller is coupled to a relatively low-speed general purpose peripheral bus which is coupled to a plurality of integrated general purpose peripherals. The relatively high-speed peripheral bus host bridge is coupled to a relatively high-speed peripheral bus capable of supporting a plurality of communication-oriented and other peripherals. The secondary memory controller shares an address bus with the general purpose peripheral bus controller and shares a data bus with either the primary memory controller or the general purpose peripheral bus controller. The control timing of the secondary memory controller is independent of the control timing of the general purpose peripheral bus controller. Also, a processor arbiter is coupled to the embedded processor, and a relatively high-speed peripheral bus arbiter is coupled to the peripheral bus host bridge.

An embedded system utilizing this flexible microcontroller can include a relatively low-speed general purpose peripheral bus and a relatively high-speed peripheral bus, both external to the microcontroller. The external relatively low-speed general purpose bus can be coupled to the relatively low-speed general purpose peripheral bus controller, and the external relatively high-speed peripheral bus can be coupled to the relatively high-speed peripheral bus host bridge.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF PREFERRED EMBODIMENT

The following related patent applications are hereby incorporated by reference as if set forth in their entirety:

U.S. patent application Ser. No. 09/379,015, entitled METHOD AND APPARATUS FOR OVERLAPPING PROGRAMMABLE ADDRESS REGIONS, filed concurrently;

U.S. patent application Ser. No. 09/379,012, entitled GENERAL PURPOSE BUS WITH PROGRAMMABLE TIMING, filed concurrently;

U.S. Patent Application Ser. No. 09/379,014, entitled CLOCK SYNCHRONIZATION, filed concurrently;

U.S. patent application Ser. No. 09/379,456, entitled PC/AT-COMPATIBLE MICROCONTROLLER, filed concurrently; and U.S. patent application Ser. No. 09/379,159, entitled CONTROL METHODOLOGY FOR ROM AND DRAM SHARING A DATA BUS, filed concurrently.

Figure 1:
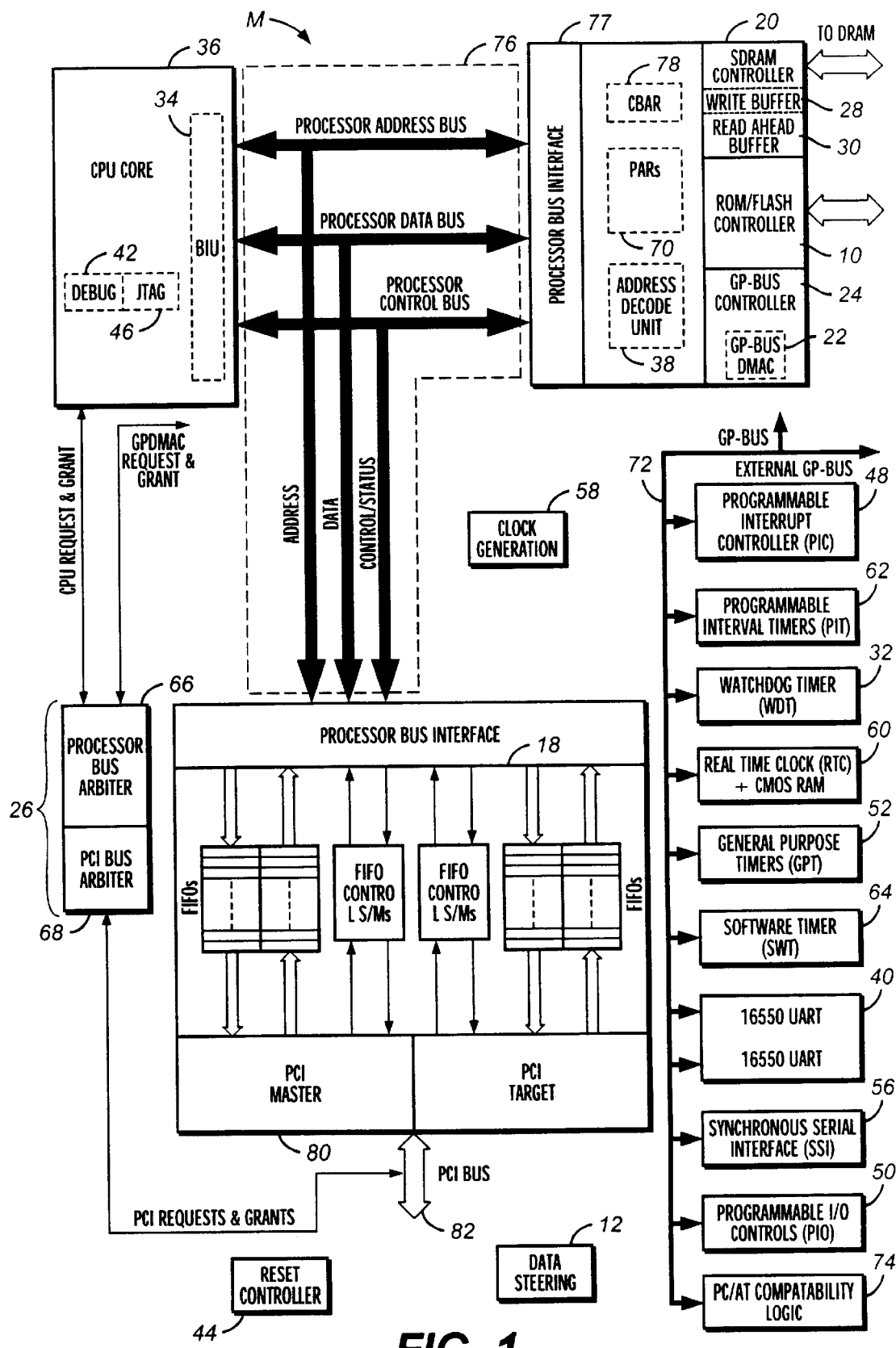
FIG. 1 is a block diagram of some elements of an exemplary microcontroller according to one embodiment.

Turning now to the drawings, FIG. 1 shows a typical microcontroller M in accordance with the present invention. The microcontroller M provides a highly integrated or embedded CPU 36 with a complete set of peripherals that are superset of common PC/AT peripherals and with a set of memory mapped peripherals. In the disclosed exemplary embodiment, the CPU 36 is the Am5x86 CPU core, which utilizes the industry standard x86 microprocessor instruction set. The CPU 36 includes an integrated 16K write back cache.

The microcontroller M provides Programmable Address Region (PAR) registers 70 that enable flexible placement of memory and peripherals into a memory address space and an I/O address space. The PAR registers 70 also allow control of important attributes like cacheability and write protection for memory resources. Both the PAR registers 70 and a Configuration Base Address register (CBAR) 78 serve as address decode registers. While the PAR registers 70 are memory-mapped, the CBAR 78 is direct-mapped to I/O.

An address decoding unit (ADU) 38 provides flexible distributed memory and I/O address decode logic. Address decode is distributed between a general purpose (GP)-Bus Controller 24, memory controllers such as a read-only memory (ROM) controller 10 and a dynamic random access memory (DRAM) controller 20, and a Peripheral Component Interconnect (PCI) bus 82. PC/AT-compatible peripherals are direct-mapped to I/O, and remaining integrated peripherals are memory-mapped. The memory space and I/O space of a general purpose bus 72 are accessible by the CPU 36. The memory space and I/O space of the PCI bus 82 are accessible by the CPU 36, the PCI master controller 80, and external PCI bus masters.

A system arbiter 26 includes an arbiter 66 for performing arbitration for a processor bus 76 (shown divided into its address, data, and control portions) and an arbiter 68 for performing arbitration for the PCI Bus 82. The processor bus arbiter 66 may arbitrate between several possible processor bus masters. For example, the processor bus arbiter 66 may handle requests for the CPU 36, the general purpose bus DMA controller 22, and the PCI host bridge 18 on behalf of an external bus master requesting access to DRAM. The PCI bus arbiter 68 may arbitrate between five possible PCI masters.

A processor bus interface 78 is responsible for DMA cache snooping, dynamic clock speed adjusting, dynamic bus sizing, ready signal consolidation, Memory Mapped Configuration Region (MMCR) control, and general purpose address control. A bus interface unit, or BIU, 34 basically assists the CPU 36 with bus, DMA, and memory control.

A clocks module 58 provides oscillators and phase locked loops (PLLs) to support the DRAM controller 20, UARTs 40, general purpose timers (GPT) 52, an d a real-time clock (RTC) 60.

The DRAM controller 20 provides SDRAM (synchronous DRAM) support, symmetric and asymmetrical DRAM support, SDRAM auto refresh support, SDRAM Error Correction Code (ECC) support, DRAM write buffering support, DRAM read pre-fetching support, read-around-write support, and supports up to 256 megabytes of DRAM. The DRAM controller 20 may service requests from the CPU 36, the PCI host bridge 18 on behalf of an external PCI master, or the general purpose bus DMA controller and may issue commands to SDRAM devices. DRAM cycles may be also be initiated by a write buffer 28 or a read-ahead buffer 30 internal to the DRAM controller 20. The write buffer 28 and the read-ahead buffer 30 together provide buffering techniques to optimize DRAM system performance.

A data steering block 12 stores data and routes data as needed from 8/16-bit devices from/to the general purpose bus 72 to/from a CPU bus. On DMA SDRAM reads, the data steering block 12 may save data until the next address strobe.

A general purpose bus controller 24 controls the general purpose bus 72, an internal and external bus that connects 8- or 16-bit peripherals to the microcontroller M without glue logic. Features of the controller 24 include 8 external chip selects, programmable bus interface timing, "ready" signal support for external devices, and support for 8/16-bit I/O and memory mapped I/O cycles. In the disclosed embodiment, the general purpose bus 72 supports a programmable interrupt controller (PIC) 48, a programmable interval timer (PIT) 62, a watchdog timer (WDT) 32, the real-time clock (RTC) 60, the general purpose timers (GPT) 52, a software timer (SWT) 64, UARTs 40, a synchronous serial interface (SSI) 56, programmable I/O logic 50, and PC/AT compatibility logic 74.

The microcontroller M includes a DMA controller 22 (general purpose bus DMAC) on the general purpose bus 72. The controller 22 is shown integrated with the general purpose bus controller 24. The DMA controller 22 is designed to handle any DMA accesses between general purpose bus peripherals (internal or external) and DRAM. Features of the controller 22 includes support for up to 7 DMA request channels (with a maximum of 4 external requests), support for three 16-bit channels and four 8-bit channels, buffer chaining capability in enhanced mode, fly-by (single cycle) transfers between general purpose bus peripherals and DRAM, and variable clock modes. The controller 22 is PC/AT-compatible.

A PIO (programmable I/O) unit 50 provides PIO logic to support 32 programmable I/O signals (PIOs) to monitor signals and control devices not handled by other functions of the microcontroller M. The PIOs are shared with other functions on the microcontroller M.

A timers unit 52 provides general purpose timers for generic timing or counting applications. Features of the timers unit 52 include three 16-bit timers, two-stage cascading of timers, and several modes of operations.

An in-circuit emulator (ICE) core 42 provides an integrated debug interface for embedded hardware/software debug during a special debug mode, ICE mode. Controllability and observability may be achieved through a fast JTAG-compliant serial interface.

A PCI host bridge 18 is integrated into the microcontroller M which allows the CPU 36 to generate PCI master transactions and allows external PCI masters to access the microcontroller DRAM space. The PCI Host bridge 18 may be a 33 MHz, 32-bit PCI Bus Revision 2.2-compliant host bridge interface.

A PIC 48 includes 3 industry standard programmable interrupt controllers (PICs) integrated together with a highly programmable interrupt router. Two of the PICs 48 may be cascaded as slaves to a master PIC which arbitrates interrupt requests from various sources to the CPU 36. The PICs 48 may be programmed to operate in PC/AT-compatible mode. The router may handle routing of 33 various external and internal interrupt sources to the 22 interrupt channels of the three PICs.

A programmable interval timer (PIT) 62, which is compatible to 8254 PIT circuitry, is provided. The PIT 62 provides three 16-bit general purpose programmable channels, six programmable counter modes, and binary and BCD counting support.

The microcontroller M further includes an integrated reset controller 44 to control the generation of soft or hard resets to the CPU 36 and system resets to the various internal cores. The reset controller 44 provides a control bit to enable ICE mode after the CPU 36 has been reset.

An integrated ROM/Flash controller 100 provides a glueless interface to up to three ROMs, EPROMs, or flash devices. It supports asynchronous and advanced page-mode devices.

The RTC block 60 is compatible with the Motorola MC 146818A device used in PC/AT systems. The RTC 60 supports binary or BCD representation of time, calendar, and alarm, its own power pin and reset, 14 bytes of clock and control registers, 114 bytes of general purpose RAM, three interrupts sources, battery backup capability, and an internal RTC reset signal to perform a reset at power-up.

A synchronous serial interface (SSI) 56 provides efficient full-duplex and half-duplex, bi-directional communications to peripheral devices. Other features include clock speed programmable from 64 KHz to 8 MHz and multiple device enables.

A software timer (SWT) 64 is a peripheral on the GP-Bus 72 which provides a millisecond time base with microsecond resolution timing for software. The peripheral 64 includes a 16-bit millisecond up counter and a 10-bit millisecond up counter.

A test controller block 46 includes test logic such as the JTAG controller. The test logic is provided to test and ensure that the components of the microcontroller M function correctly.

A UART block 40 includes two PC16550-compatible UARTs, both capable of running 16450 and 16550 software. The UART block 40 supports DMA operation, a FIFO mode, an internal baud rate clock to handle baud rates up to 1.5 M bits/s, false start bit detection, break detection, full-duplex operation, and other features.

A watchdog timer block (WDT) 32 is a mechanism to allow system software to regain control of the microcontroller M when the software fails to behave as expected. The watchdog timer block 32 supports up to a 30-second timeout with a 33 MHz CPU clock.

The PC/AT compatibility logic 74 provides PC/AT-compatible functions. The PC/AT compatible integrated peripherals include the DMA controller 22, the PIT 62, the PIC 48, the GPT 52, the UARTs 40, and the RTC 60.

This particular microcontroller is merely illustrative and not exhaustive. The techniques and circuitry according to the invention could be applied to a wide variety of microcontrollers and other similar environments. The term "microcontroller" itself has differing definitions in industry. Some companies refer to a processor core with additional features (such as I/O) as a "microprocessor" if it has no onboard memory, and digital signal processors (DSPs) are now used for both special and general purpose controller functions. As here used, the term "microcontroller" covers all of the products, and generally means an execution unit with added functionality all implemented on a single monolithic integrated circuit.

As stated above, the microcontroller M provides a flexible architecture to support both general embedded applications and communications applications. The figures below are submitted to illustrate some of the features inherent in the microcontroller M which provide this flexibility.

The microcontroller M of the disclosed system is designed as a medium- to high-performance system-on-a-chip. In the disclosed embodiment, the microcontroller M includes an Am486-DX5(133 MHz core) with state-of-the-art DRAM support with write buffering and read-ahead buffering. These features are optimized for maximum CPU performance. Also, the microcontroller M has debug support, both at the CPU and at the system level. The microcontroller M has a version 2.2-compliant PCI Bus which allows customers to connect high bandwidth (roughly 133 MB/s peak) state-of-the-art peripheral devices, such as network controllers and various other communications devices. Although a PCI bus and associated circuitry is disclosed, system designers of ordinary skill will recognize that other high-performance bus architectures may readily be implemented in the microcontroller M of the illustrative system. The microcontroller M further integrates the entire PC/AT peripheral device set and supports very flexible address mapping to allow both Windows operating systems and many real-time operating systems to work with the microcontroller M. The microcontroller M is particularly well-suited for applications requiring high throughput and low latency.

ROM Data Bus

Figure 2:
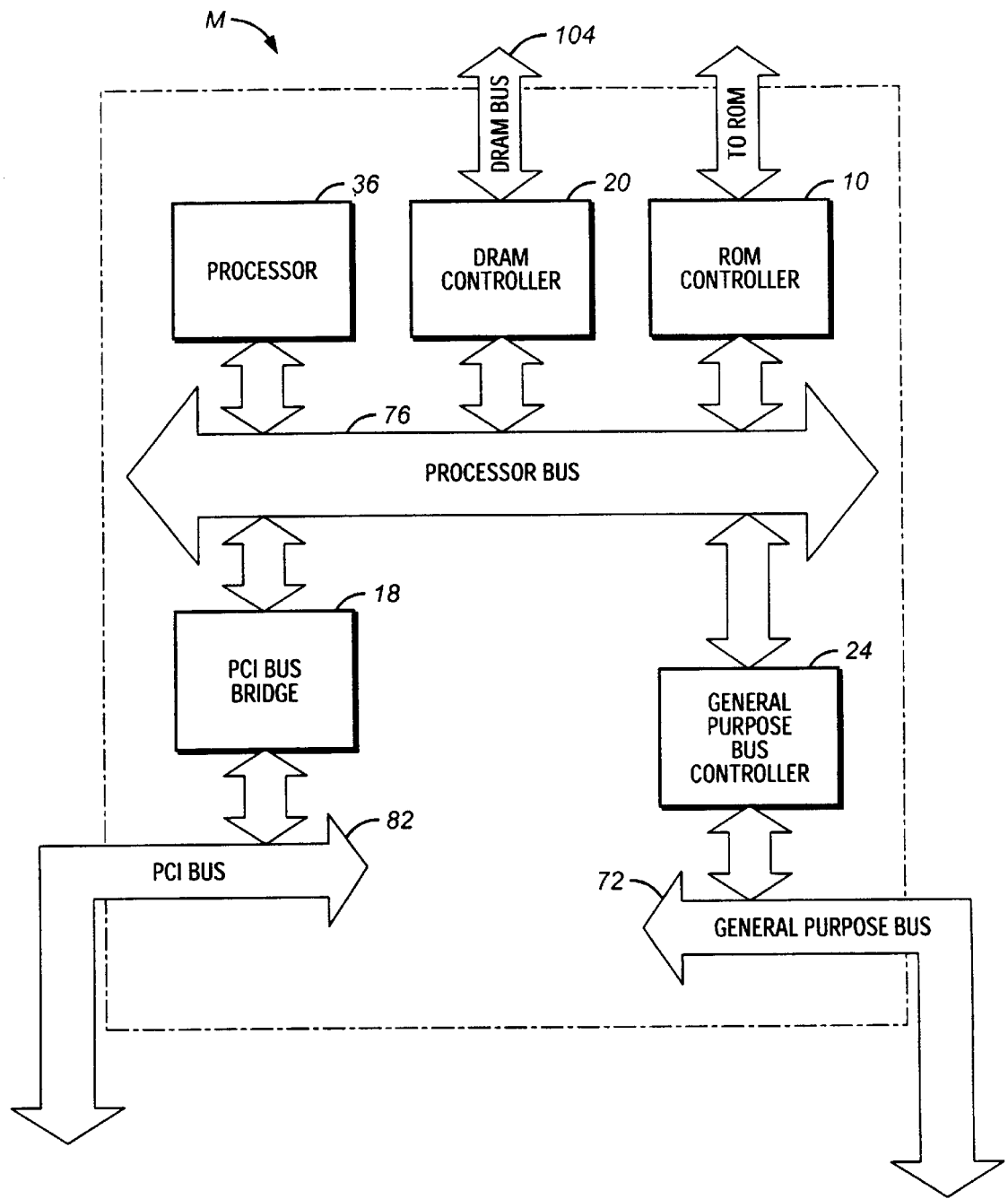
FIG. 2 is a block diagram of some particular features of the microcontroller of FIG. 1 according to one embodiment.

FIG. 2 is a simplified block diagram of the microcontroller M of FIG. 1, according to one embodiment. The microcontroller M includes the processor 36, the DRAM memory controller 20 and the ROM/flash controller 10, coupled to the processor bus 76, all of which were introduced in FIG. 1. The processor 36 may be one of any number of processors on the market. The DRAM controller 20 may be coupled to DRAM which is external to the microcontroller M. The ROM/flash controller 10 also may be coupled to one or more ROMs, including flash ROMs, external to the microcontroller M. Heretofore, references to ROMs generally are meant to include flash ROM devices.

The ROM controller 10 provides a mechanism for the processor 36 to communicate with an external ROM device. Likewise, the DRAM controller 20 allows the processor 36 to retrieve instructions from an external memory device as well as reading from or writing to data locations in memory.

Also coupled to the processor bus 76 is the PCI bus bridge 18 which permits the addition of the PCI bus 82 to the microcontroller M. The PCI bus 82 permits relatively high-speed peripheral components to be coupled to the microcontroller M and communicate with one another. Peripheral components may be part of the microcontroller M itself, or may be connected to the PCI bus 82, external to the microcontroller M. Accordingly, the PCI bus 82 is shown in FIG. 2 as residing both internal and external to the microcontroller M. The PCI bus bridge 18 handles communication between devices connected to the PCI bus 82.

Also attached to the processor bus 76 is the general purpose bus controller 24 which is coupled to the general purpose bus 72 as part of the microcontroller M. In the disclosed embodiment, the general purpose bus 76 provides a connection to relatively low-speed memory peripheral devices so that the devices may communicate with the processor 36 and the memory. As with devices connected to the PCI bus 82, these relatively low-speed peripheral devices may be internal to the microcontroller M or may be coupled to the microcontroller M externally. Accordingly, the general purpose bus 72 is shown in FIG. 2 with portions that are both internal and external to the microcontroller M.

The general purpose bus controller 24 provides an interface to peripheral devices connected to the internal and external portions of the general purpose bus 72. Further, the general purpose bus controller 24 supports programmable timing of externally connected peripheral devices. The microcontroller M also supports programmable decoding of both memory and I/O addresses. The flexibility of the general purpose bus 72 thus enables embedded system designers to couple the microcontroller M to a vast array of external devices without the need for glue logic.

Thus, the microcontroller M of FIG. 2 may support internal peripheral components and as well provide the capability to add external peripheral devices. Further, the architecture supports the addition of external system memory and ROM. In order to connect to this external circuitry, the microcontroller M includes three interfaces, as shown in FIG. 2. First, a DRAM bus 104 is shown, coupled to the DRAM controller 20. Second, the PCI bus 82, as described above, provides for external coupling of relatively high-speed peripheral devices to the microcontroller M. Third, the general purpose bus 24 provides for external coupling of relatively low-speed peripheral devices to the microcontroller M without requiring additional glue logic, such as programmable array logic.

The ROM controller 10, however, is not coupled to a dedicated bus. Rather, the other available interfaces are shared so that a connection to one or more external ROM devices can be made. This implementation is discussed in more detail in conjunction with the description of FIG. 4.

Figure 3:
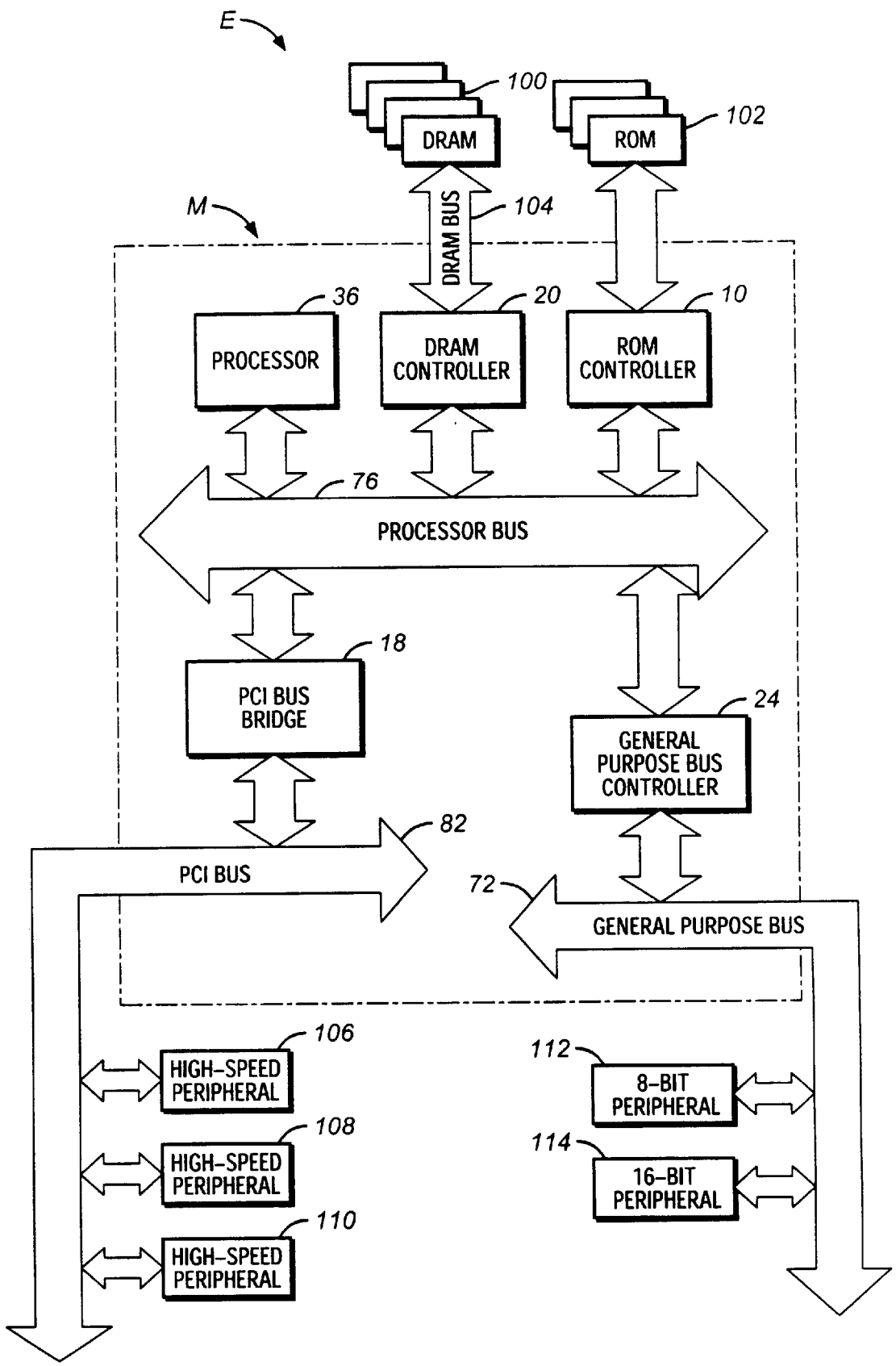
FIG. 3 is a block diagram of an exemplary embedded system including the microcontroller of FIG. 1.

Next, FIG. 3 shows an embedded system E, of which the microcontroller M is a part. Here, as in FIGS. 1 and 2, the PCI bus 82 and the general purpose bus 72 are shown. Also shown is a plurality of DRAM 100, coupled to the DRAM controller 20. The microcontroller M of the exemplary embodiment provides the capability for the embedded system E to include both relatively high-speed peripheral devices, connected to the PCI bus 82 and relatively low-speed peripheral devices, coupled to the general purpose bus 72. Accordingly, FIG. 3 shows a high-speed peripheral device 106, a second high-speed peripheral device 108, and a third high-speed peripheral device 110, all coupled to the PCI bus 82, external to the microcontroller M. FIG. 3 further shows an 8-bit peripheral device 112 and a 16-bit peripheral device 114 coupled to the general purpose bus 72, also external to the microcontroller M. Thus, using the microcontroller M, an embedded system E with devices capable of a variety of functions may be envisioned. Such an embedded system may be useful for several different applications.

Figure 5:
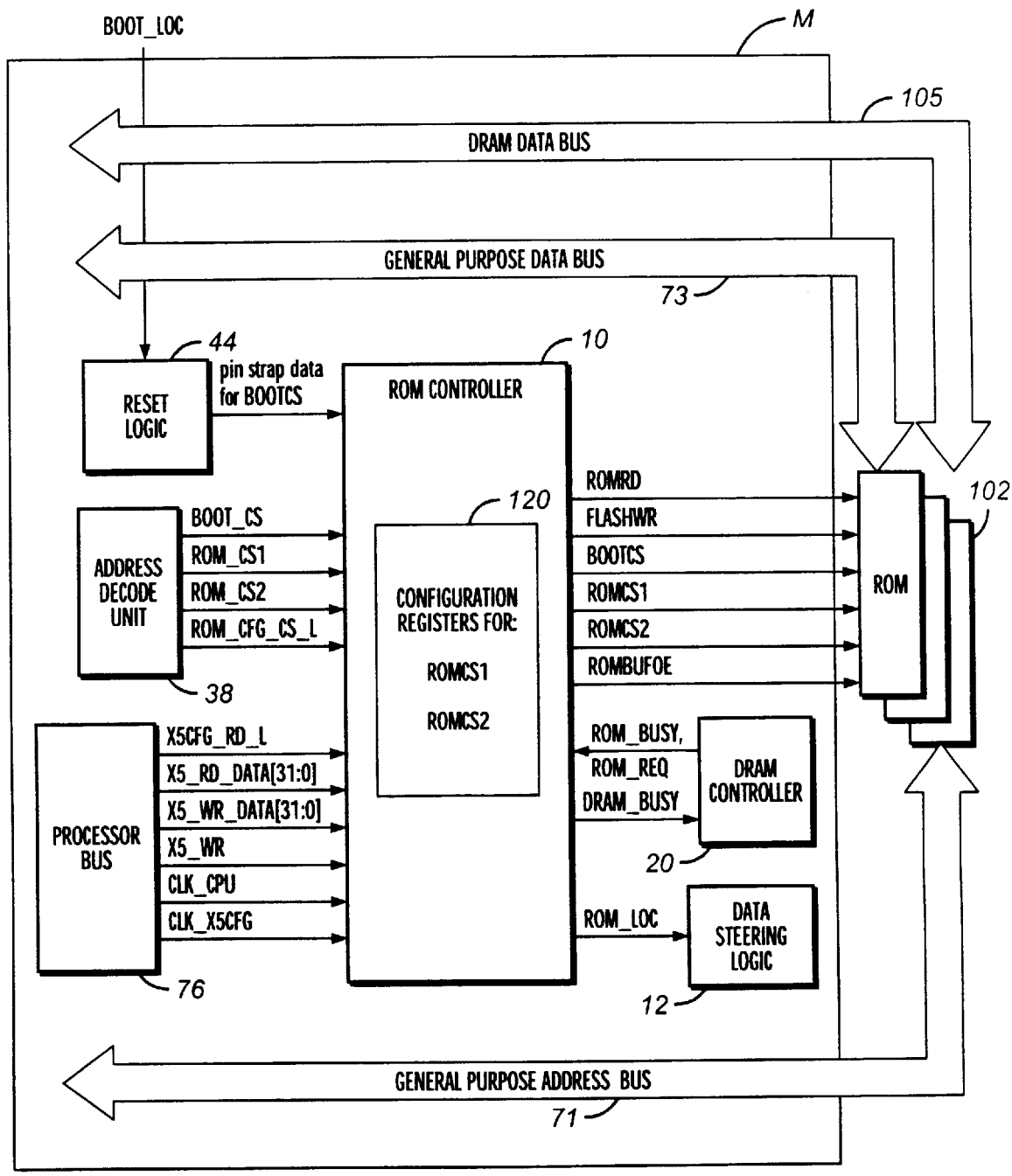
FIG. 5 is a block diagram of the ROM controller portion of the microcontroller of FIG. 1 according to one embodiment.

FIG. 3 further shows the ROM controller 10 coupled to one or more ROM devices 102, which are external to the microcontroller M. As stated above, in the disclosed embodiment, the ROM controller 10 does not have a dedicated path to the ROM 102. Instead, the ROM or ROMs 102 are coupled to the ROM controller 10 using either the DRAM bus 104 or the general purpose bus 72, as shown in FIG. 5, below.

In the disclosed embodiment, the microcontroller M supports up to three ROMs 102. First, a ROM containing software which is executed upon power up, commonly known as a boot ROM, is supported. Additionally, two non-boot ROMs may also be connected to the microcontroller M. The microcontroller M provides no dedicated path between the ROM controller 10 and the ROM or ROMs 102. Instead, the ROM(s) 102 are coupled to the microcontroller M using interfaces already provided for other components of the embedded system E. This flexible architecture takes full advantage of the available interfaces, as well as reducing the pins required to support the ROM devices.

As FIG. 3 shows, the microcontroller M supports four different buses: the processor bus 76, the DRAM bus 104, the PCI bus 82, and the general purpose bus 72. Three of these buses are allocated pins on the microcontroller M such that they may be connected to devices externally. As usual, each bus includes an address portion, or address bus, a data portion, or data bus, and a control portion, or control bus. The address bus specifies the location from where the data is either retrieved or submitted. The data bus transfers the actual data. The control bus contains control signals which coordinated activities between the sender, the receiver, and the address and data buses as well.

Because of the presence of multiple buses on the microcontroller M, the microcontroller M includes a collection of configuration registers which allow for flexible address mapping of the microcontroller M. In the disclosed scheme, memory may be mapped to one of four places: the DRAM 100, the ROM 102, the general purpose bus 72, or the PCI bus 82. I/O may be mapped to either the general purpose bus 72 or the PCI bus 82. When I/O or memory is mapped to one of the buses, the intended recipient is a device connected to that bus. So, for example, for the 8-bit peripheral 112 connected to the general purpose bus 72 in FIG. 3, an address allocated to the general purpose bus 72 may be intended for that 8-bit peripheral 112.

For purposes of addressing the ROM or ROMs 102, the microcontroller M treats the ROM 102 as one of a plurality of possible devices connected to the general purpose bus 72. Accordingly, addresses which are mapped to the ROM 102 are received on the address bus portion of the general purpose bus 72. So, although the microcontroller M provides for distinct address mapping as between the ROM 102 and the general purpose bus 72, the address bus of the general purpose bus 72 is actually used to communicate with the ROM 102. Thus, a type of "address sharing" between the general purpose bus 72 and the ROM controller 10 is employed in the microcontroller M.

Although the ROM 102 shares the address bus with other devices on the general purpose bus 72, the same may or may not be true for the data bus of the general purpose bus 72. Instead, the microcontroller M provides the capability for the ROM 102 to be coupled to either the data bus of the DRAM bus 104 or the data bus of the general purpose bus 72. In the disclosed embodiment, the general purpose bus 72 may be configured to be either 8-bit or 16-bit, while the DRAM bus 104 is a high-speed 32-bit bus. Such flexibility gives embedded system designers great latitude in selection of ROM devices for use with the microcontroller M. Further, different ROM devices 102 may use distinct data buses. Thus, both high-speed ROMs and slower ROMs may simultaneously be part of the embedded system E using the microcontroller M.

Figure 4:
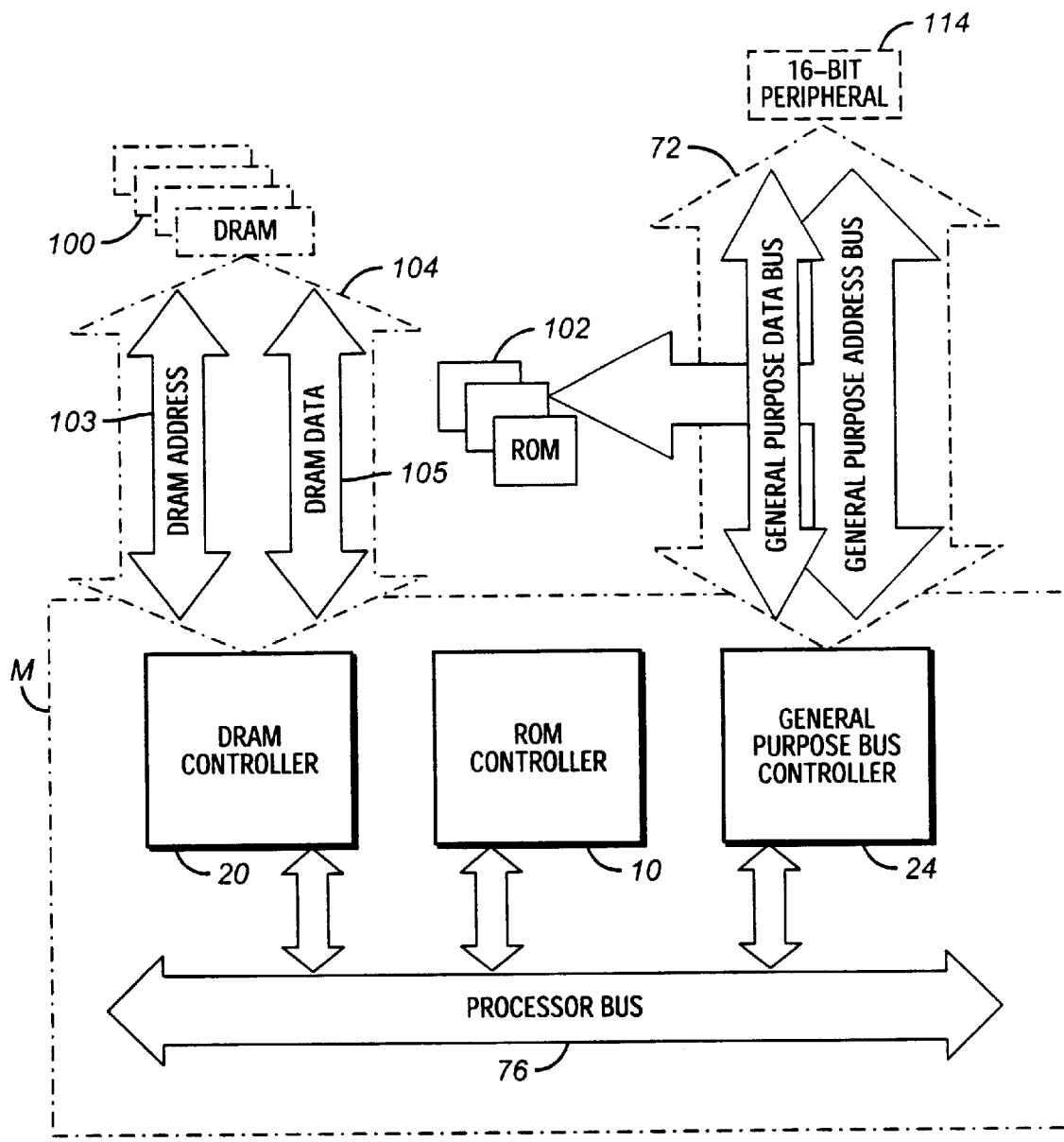
FIG. 4 is a block diagram illustrating the mechanism by which a ROM device may be connected to the microcontroller of FIG. 1 as part of an embedded system.

FIG. 4 is another block diagram of the microcontroller M, used to illustrate how the external ROM 102 is accessed. First, the DRAM bus 104 is shown divided into two parts: a DRAM address bus 103 and a DRAM data bus 105. Likewise, the general purpose bus 72 is shown, also separated into two components: a general purpose address bus 71 and a general purpose data bus 73. As in FIGS. 2 and 3, the DRAM controller 20, the ROM controller 10, and the general purpose bus controller 24 are all connected to the processor bus 76.

FIG. 4 illustrates how an external connection to the ROM 102 is made. As shown, the ROM controller 10 communicates with the ROM 102 over the general purpose address bus 71, which is part of the general purpose bus 72. Thus, a portion of memory may be "mapped" to the ROM 102 by writing to the configuration registers contained in the microcontroller M. The configuration registers are discussed in detail in the commonly assigned patent application, entitled "METHOD AND APPARATUS FOR OVERLAPPING PROGRAMMABLE ADDRESS REGIONS," previously incorporated herein by reference.

Once an address intended for the ROM 102 is placed on the processor bus 76, the processor bus interface 78, first introduced in FIG. 1, determines the type of transaction sought. Examples include memory reads or writes, I/O reads or writes, or other transactions, such as an interrupt acknowledge cycle. Next, the address decode unit 38 decodes the address and generates chip selects for the appropriate controller. Thus, for a ROM-mapped address, the address decode unit 38 provides a chip select for the ROM controller 10. The appropriate timing for the access is then provided. In this discrete manner, the ROM-mapped address placed on the processor bus 76 is made available to the general purpose address bus 71. However, other mechanisms for addressing the ROM device from the processor bus 76 are possible as well.

As the general purpose address bus 71 is used to address the ROM 102, the general purpose data bus 73 may also be used to perform data transfers between the ROM 102 and any requesting device. However, it is again noted that the general purpose bus 72 is a relatively low-speed bus, used for connection to relatively low-speed peripheral devices. In the disclosed embodiment, the general purpose bus 72 may be configured as either 8- or 16-bit data width. In the disclosed embodiment, a register in the general purpose bus controller 24 enables a data width for each of the eight chip select signals (and the eight devices connected thereto) to be programmed. Thus, some peripheral devices connected to the general purpose bus 72 may operate with 8-bit data while other peripheral devices, also connected to the general purpose bus 72, may operate with 16-bit data. By contrast, the DRAM bus 104 is a high-speed data bus and is 32 bits in width.

Such a microcontroller architecture is beneficial to system designers. Depending on the needs of the embedded system E, an 8-bit, a 16-bit, or a 32-bit data bus may be employed to control transfers between the requesting device and the ROM 102. Further, because each ROM 102 may use a different data bus, multiple ROMs connecting to the microcontroller M may have distinct capabilities without the less capable ROMs impeding the throughput of the more capable ROMs. For example, the microcontroller M simultaneously supports an 8- or 16-bit relatively slow ROM connected to the general purpose bus 72 and a high-speed, execution-in-place ROM coupled to the DRAM bus 104.

FIG. 5 is a block diagram depicting the ROM controller 10 of the microcontroller M according to one embodiment. For purposes of clarity, the figure depicts only circuitry relevant to understanding how a ROM coupled to the microcontroller M may be accessed. Connected to the ROM controller 10, FIG. 5 shows the reset logic 44, the address decode unit 38, the processor bus 76, the DRAM controller 20, and the data steering logic 12, all of which were introduced in FIG. 1.

The address decode unit 38 sends chip select signals to the ROM controller 10. In the disclosed embodiment, the microcontroller M supports up to three external ROM devices. Accordingly, FIG. 5 shows the signals BOOT_CS, ROM_CS1, and ROM_CS2 as inputs to the ROM controller 10. The boot ROM is enabled using the BOOT_CS signal while two non-boot ROMs are enabled using the ROM_CS1 or ROM_CS2 chip select signals. All three of these ROMs 102 are addressed from the general purpose address bus 71, shown in gray shading in FIG. 5. However, one of two different data buses, the general purpose data bus 73, or the DRAM data bus 105 may be selected for sending data to or receiving data from any of these three ROM devices 102. Further, each ROM 102 may select a different data bus for data transmission.

Also coming from the address decode unit 38, a ROM_CFG_CS_L signal is shown. This signal enables access to a set of configuration registers 120 which are part of the ROM controller 10. For the non-boot ROMs, that is, those driven by either the ROM_CS1 or ROM_CS2 signals, these configuration registers 120 are used to select which data bus, the DRAM data bus 105 or the general purpose data bus 73, is to be used for data transmission between either of these ROMs and the processor 36 of the microcontroller M. Whether data is read from or written to the configuration registers 120 is determined from the CPU signal X5_WR. Data is stored in the configuration registers on the rising edge of CLK_X5CFG. For loading the configuration registers 120, data is written via the processor data bus 76, shown in FIG. 5 as X5_WR_DATA [31:0]. For reading the configuration registers 120, data is transferred via the processor bus 76, shown in FIG. 5 as X5_RD_DATA [31:0].

However, for the boot ROM, that is, the ROM driven by the BOOT_CS signal, the data bus selection is determined using pin strapping. FIG. 5 shows the signal BOOT_LOC coming into the reset logic 44 of the microcontroller M. The BOOT_LOC signal defines whether the boot ROM is located on the DRAM data bus 105 or the general purpose data bus 73. The BOOT_LOC designation is actually a configuration pin latched into the chip of the microcontroller M. When PWRGOOD is asserted, a determination is made whether the DRAM data bus 105 or the general purpose data bus 73 is used as the ROM data bus. FIG. 5 shows the DRAM data bus as gray-shaded, to denote its selection as the data bus for accessing the boot ROM.

Thus, for the microcontroller M of the illustrative system, ROM devices are addressed via the general purpose bus, independent of whether the data pins of the ROM 102 are connected to the data bus of the general purpose bus 72 or the DRAM bus 104. Further, ROM devices are accessible by the processor 36 only. If either the general purpose bus DMA controller 22 or the PCI bus master 18 attempts a read from or a write to the ROM 102, the transfer forces a DRAM cycle and the data is discarded.

Looking back to FIG. 1, it is again noted that the general purpose bus 72 is controlled by the general purpose bus controller 24. Among its many features, the general purpose bus controller 24 includes registers for programmable timing of the bus interface. More details are provided in the commonly assigned patent application, entitled "GENERAL PURPOSE BUS WITH PROGRAMMABLE TIMING," which has previously been incorporated by reference.

Although the general purpose bus 72 has its own controller 24, FIG. 5 shows that no control signals are received from the general purpose bus controller 24 by the ROM controller 10 or the ROM 102. Thus, the control timing of the ROM controller 10 is independent of the control timing of the general purpose bus controller 24. The programmable timing capability of the general purpose bus controller 24 does not affect the BOOTCS, ROM_CS1, or ROM_CS2 chip selects shown in FIG. 5. However, if a ROM device is instead connected to the general purpose bus 72 as an external peripheral device, the device may use the programmable timing feature of the general purpose bus controller 24.

Because the DRAM data bus 105 may potentially service both the DRAM 100 and the ROM 102, the voltage requirements of each device merit consideration. In the disclosed embodiment, the general purpose bus 72 is 5V tolerant and drives 3.3V. However, not all devices are 5V tolerant. For example, 3.3V DRAM is known to be available on the market. So, if a 3.3V DRAM device is not 5V tolerant and shares the DRAM data bus 105 with 5V ROM devices, the 3.3V DRAM device could be damaged during ROM read accesses.

The incompatibility between device voltage tolerances is readily addressed using an isolation buffer. The isolation buffer is necessary when using a 5V ROM device and a 3.3V DRAM device that is not 5V tolerant on the same bus. The ROMBUFOE signal is provided to support an isolation buffer, and this signal can be used for devices on the DRAM bus 104 or the general purpose bus 72. In the disclosed embodiment, the ROM controller 10 controls the ROMBUFOE signal. Accordingly, FIG. 5 shows the ROMBUFOE signal coming from the ROM controller 10.

Figure 6A:
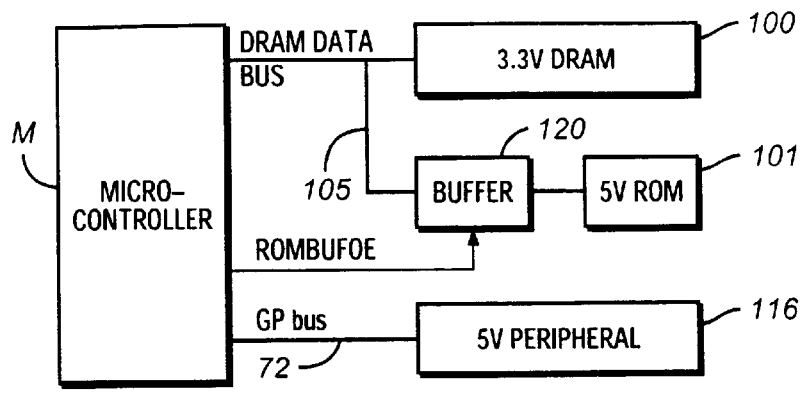
FIGS. 6a, 6b and 6c are examples of how voltage isolation may be achieved when devices of distinct voltage requirements share a bus of the microcontroller of FIG. 1 according to one embodiment.
Figure 6B:
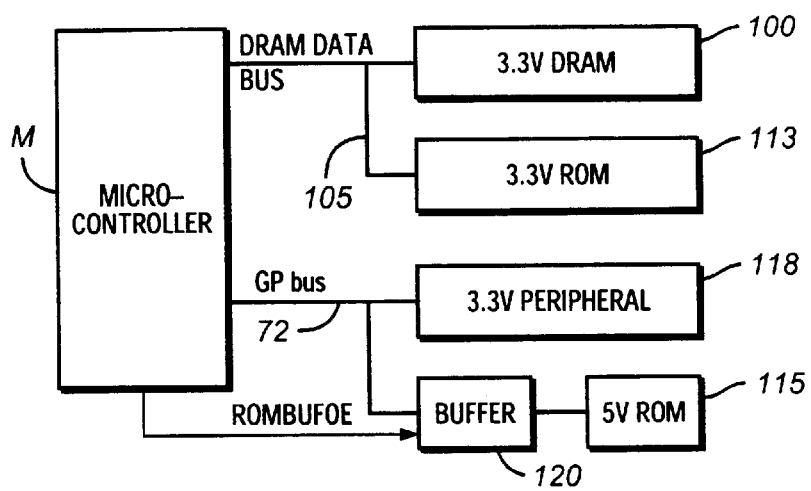
Figure 6C:
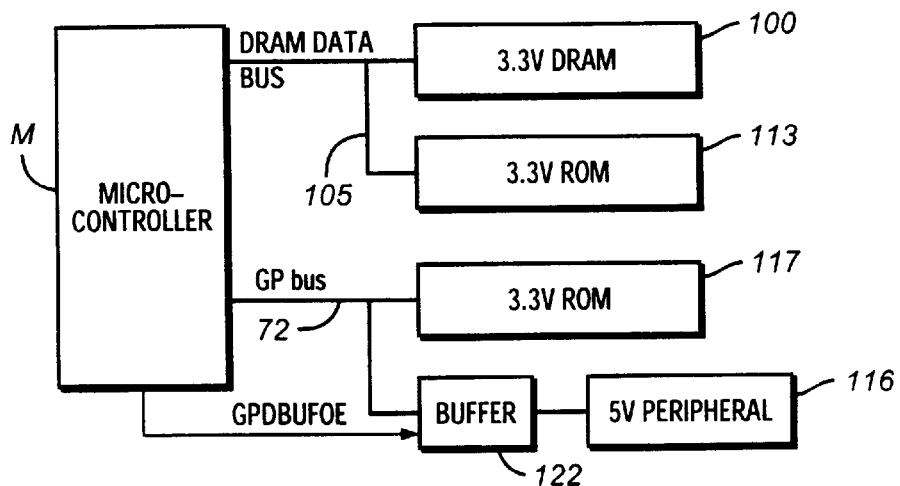

FIGS. 6a, 6b, and 6c illustrate some scenarios where both DRAM and ROM may be coupled on the DRAM data bus 105 or the general purpose (address or data or both) bus 72. In FIG. 6a, a buffer 120 is shown coupled between the 3.3V DRAM device 100 and a 5V ROM device 101, both on the DRAM data bus 105. The ROMBUFOE signal coming from the ROM controller 10 is input into the buffer 120. The ROMBUFOE signal is asserted during all accesses to ROM devices, whether the devices are located on the DRAM data bus 105 or the general purpose bus 72.

The use of the buffer 120 and the ROMBUFOE signal, controlled by the ROM controller 10, is effective to prevent heavy loading by the ROM devices. Similarly, data buffers can be used on the general purpose bus 72 to control loading issues. FIG. 6c shows a GPDBUFOE signal controlling a buffer 122 in front of a 5V peripheral device 116. However, the ROMBUFOE signal, which comes from the ROM controller 10, is used to control buffers in front of ROM devices on the general purpose bus 72. Accordingly, FIG. 6b shows a buffer 121 coupled between a 3.3V peripheral device 118 and 5V ROM device 115, all of which are on the general purpose bus 72. The ROMBUFOE signal drives the buffer 121 even though the buffer 121 is on the general purpose bus 72.

If the embedded system E provides ROM devices on both the DRAM data bus 105 and the general purpose data bus 73 and data bus buffers are used on either bus, the ROMBUFOE signal is qualified with the appropriate ROM chip selects and ROMRD to prevent bus conflict in the disclosed embodiment. For example, the DRAM controller 20 may attempt to write to the DRAM 100. During this time, if the processor 36 performs a read from a ROM device that is on the general purpose data bus 73, the buffer on the DRAM data bus 105 that isolates the ROM devices from the DRAM 100 activates unless its buffer control signal, ROMBUFOE, is also qualified with the appropriate ROM chip select signal. Sharing of the DRAM data bus 105 by the DRAM 100 and the ROM 102 is described in more detail in commonly assigned patent application, entitled "CONTROL METHODOLOGY FOR ROM AND DRAM SHARING A DATA BUS," previously incorporated herein by reference.

Internal Clocks

The microcontroller M of the illustrative system is designed to generate all of the internal and system clocks. The microcontroller M receives as inputs one or more crystal interface signals which are used to generate the internal clocks needed by the various components of the microcontroller M.

Figure 7:
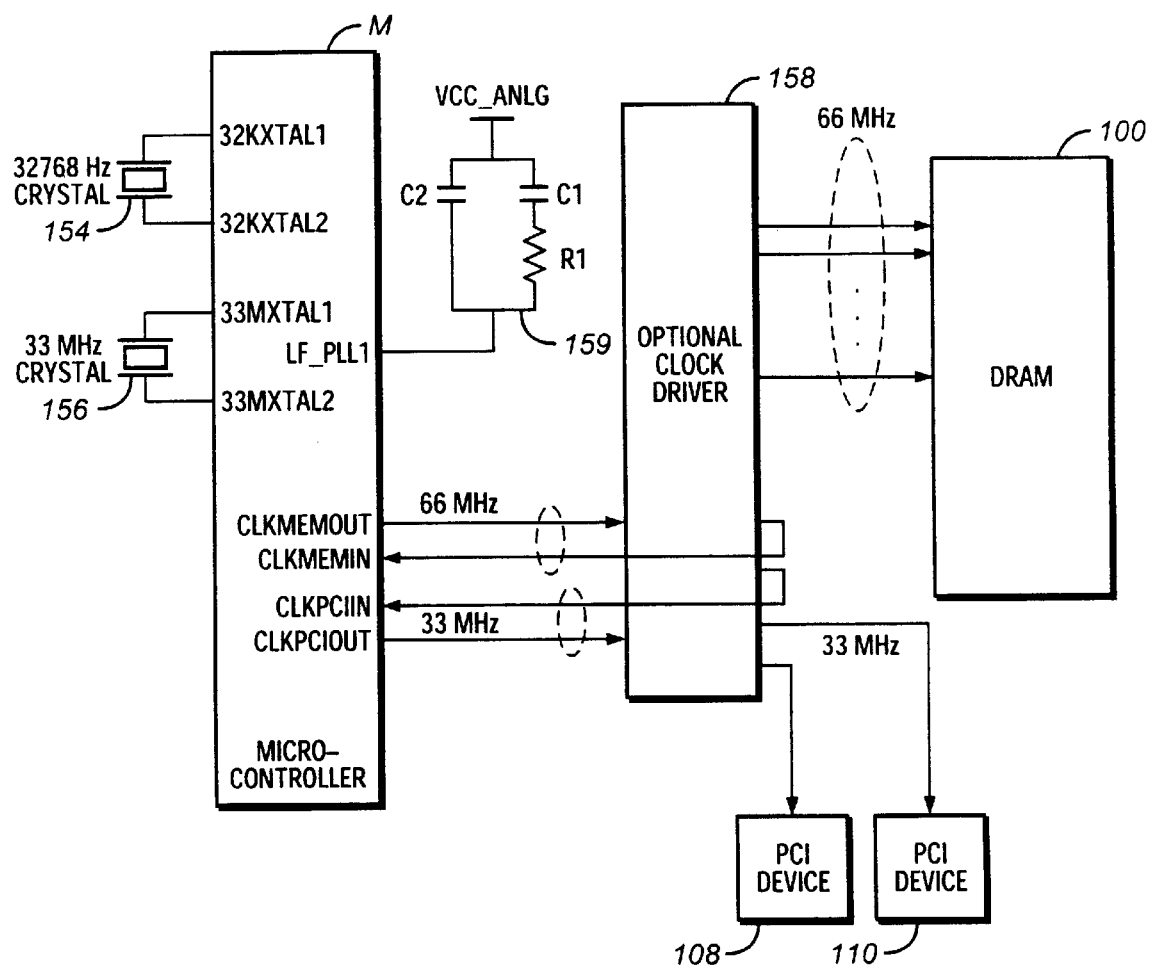
FIG. 7 is a block diagram of the system clock distribution for the microcontroller of FIG. 1 according to one embodiment.

FIG. 7 is a block diagram illustrating the system clock distribution for the microcontroller M. As inputs to the microcontroller M, a 32768 Hz crystal 154 and a 33 MHz crystal 156 are shown. Two pins of the microcontroller M are dedicated for each clock input, 32KXTAL1 and 32KXTAL2 for the 32 KHz crystal 154, and 33MXTAL1 and 33MXTAL2 for the 33 MHz crystal 156, as illustrated. The microcontroller M further includes two output pins CLKMEMOUT, which is a 66 MHz output, and a CLKPCIOUT pin, which is a 33 MHz output. As named, the CLKMEMOUT signal is intended for the DRAM 100 and supplies a 66 MHz clock. The CLKPCIOUT pin is connected to the PCI bus (not shown) which is intended for the PCI devices 108 and 110. A 33 MHz clock is supplied to the PCI bus of the microcontroller M.

An optional clock driver 158 is also featured in the clock distribution block diagram of FIG. 7. The driver 158 receives both a 66 MHz and a 33 MHz clock pulse from the microcontroller M and sends them out to the DRAM 100 and the PCI devices 108 and 110, respectively. Both clock signals, however, are also fed back into the microcontroller M using both a CLKMEMIN and a CLKPCIIN pin, provided for this purpose. The clock driver 158 provides a buffer between the microcontroller M and the external device as well as controlling the skew between them. This ensures that devices external to the microcontroller M receive the expected clock signals. Skew control is described in more detail in commonly assigned patent application, entitled "CLOCK SYNCHRONIZATION," previously incorporated by reference.

Figure 8A:
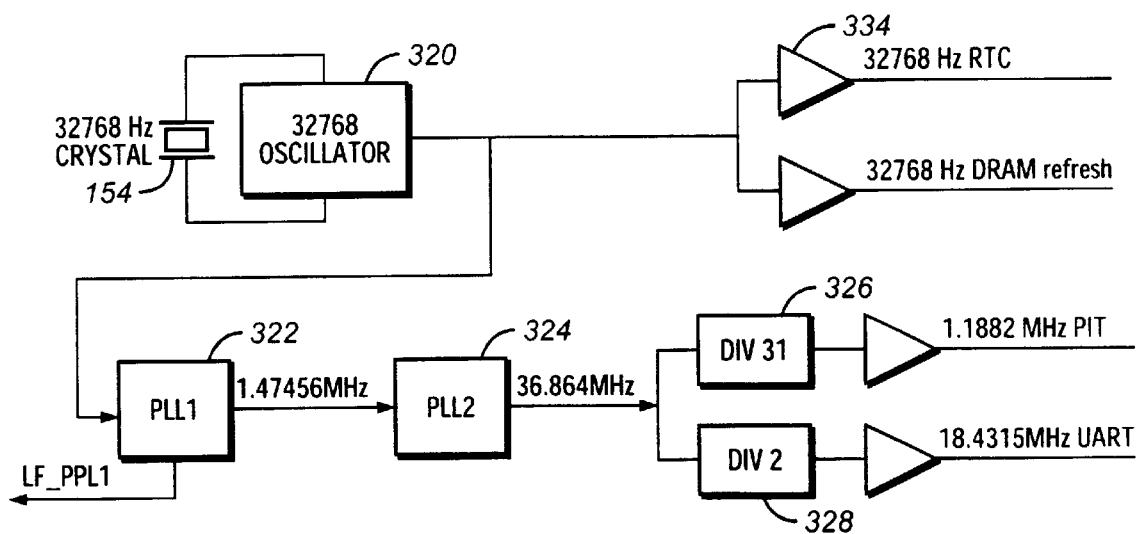
FIGS. 8(a) and 8(b) are block diagrams illustrating some of the output clock rates used by various devices of the microcontroller of FIG. 1 according to one embodiment.
Figure 8B:
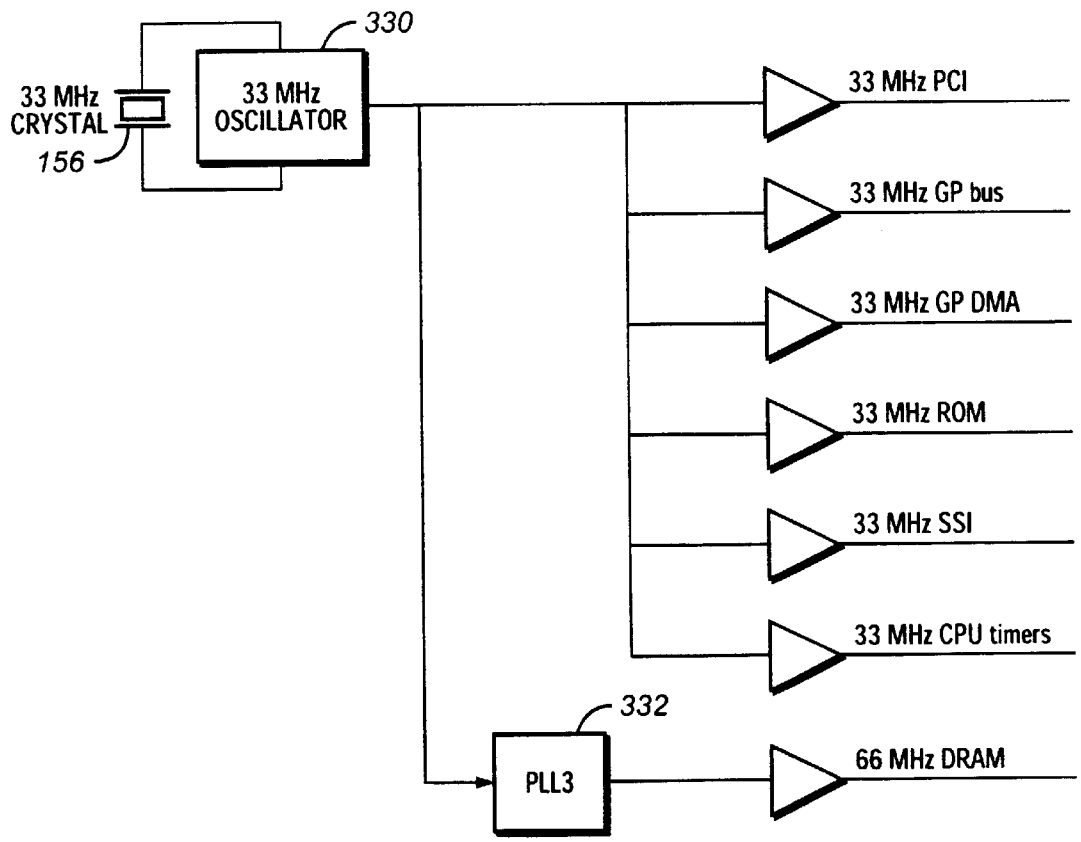

FIGS. 8a and 8b are block diagrams which illustrate how the microcontroller M uses the two clock inputs described in FIG. 7 to supply outputs for a variety of devices. FIG. 8a shows that the 32768 Hz crystal 154 is received as an input and ultimately supplies clock signals for the real-time clock 60, the DRAM refresh, the programmable interval timer 62, and the UART 40. Two phase-lock loops 322 and 344 (PLL1 and PLL2) as well as two dividers 326 and 328 are used to supply the appropriate clock frequencies for the programmable interval timer 62 and the UART 40. A 1.1882 MHz clock is supplied to the PIT 62, and a 18.4315 MHz clock is supplied to the UART 40.

FIG. 8b shows that the 33 MHz crystal 156 is coupled with a 33 MHz oscillator 330 to supply or feed clock signals for the PCI bus 82, the general purpose bus 72, the general purpose DMA controller 22, the ROM device 102, the synchronous serial interface (SSI) 56, the processor 36, and the DRAM 100. A phase-lock loop 332 (PLL3) is used to supply a 66 MHz clock to the DRAM 100. Those skilled in the art will appreciate that clock generation and distribution may be further supported with latches, registers, and the like. Further, integrating clock generation on the microcontroller M helps to minimize required external components.

Looking back to FIG. 7, an output from the microcontroller M, LF_PLL1 is also shown. This pin enables a system designer to supply a loop filter 159 external to the microcontroller M for the PLL1 output clock (a 1.47456 MHz clock, as shown in FIG. 8).

The loop filter components 159 for this clock C1, C2, and R1, are supplied externally. As shown in FIG. 7, the components C1, C2, and R1 are connected between the analog Vcc signal and the pin, LF_PLL1, of the microcontroller M. The remaining two PLLs, PLL2 and PLL3, shown in FIGS. 8a and 8b, respectively, are supplied with PLL loop filters integrated into the microcontroller M. Thus, other than the crystals 154 and 156, no external components are necessary for clock generation. However, external clock buffering may be utilized as desired.

Bus Arbitration

The microcontroller M of the illustrative system provides the capability to connect both to relatively high-speed peripheral devices and relatively low-speed peripheral devices simultaneously. Looking back to FIG. 1, the microcontroller M includes the processor bus 76, the PCI bus 82, and the general purpose bus 72. External devices may be connected to either the PCI Bus 82 or to the general purpose bus 72. The general purpose bus 72 is described in more detail in the commonly assigned patent application, entitled "GENERAL PURPOSE BUS WITH PROGRAMMABLE TIMING," previously incorporated herein by reference. Because of this multiple bus architecture, some logic for arbitrating between devices which seek control of the buses is desirable.

Figure 9:
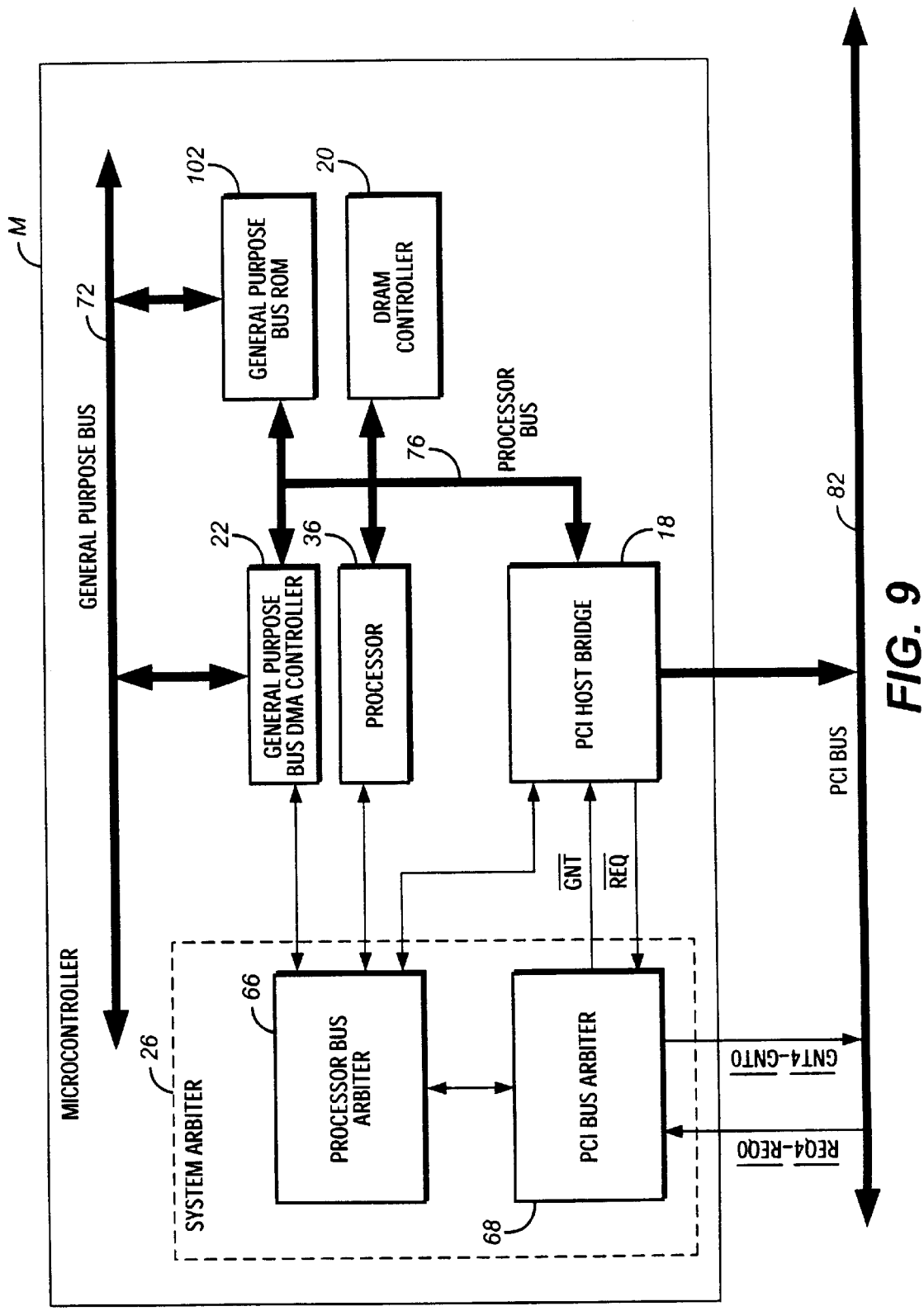
FIG. 9 is a block diagram of the system arbitration of the microcontroller of FIG. 1 according to one embodiment.

FIG. 9 is a block diagram of the system arbitration for the microcontroller M according to one embodiment. First introduced in FIG. 1, the system arbiter 26 includes two discrete arbiters, a processor bus arbiter 66 and a PCI bus arbiter 68. The processor bus arbiter 66 arbitrates between the processor 36, the PCI host bridge 18, and the general purpose bus DMA controller 22 on the internal processor bus 76. The internal processor bus 76 provides the capability for the processor 36 to access the DRAM 100, the general purpose bus 72 (and devices connected thereto), the PCI bus 82 (and PCI devices connected thereto), and the ROM or ROMs 102. The processor bus 72 further is the vehicle for the general purpose bus DMA controller 22 to access the DRAM 100. Finally, the processor bus 76 provides the capability for the PCI host bridge 18 to access the DRAM 100 for external PCI bus master cycles. The processor bus arbiter 66 controls all of these accesses to the internal processor bus 76.

The microcontroller M also supports a second arbiter, shown in FIG. 9 as the PCI bus arbiter 68. The PCI bus arbiter 68 arbitrates between the processor 36, and up to five external PCI masters on the external PCI bus 82. In accordance with the PCI Bus Specification, Version 2.1, the PCI bus arbiter 68 is a central resource which controls the access of PCI masters to the PCI bus 82. The arbitration approach is access-based, meaning a PCI master is only granted the bus when it needs (requests) the bus (except in the case of bus parking, discussed below). A simple request/grant handshake is used where each PCI master has a unique request (REQ) and grant (GNT) signal. PCI bus arbitration is "hidden," meaning arbitration for the next cycle occurs during the current cycle so that no cycles are wasted due to arbitration (except when the bus is in the idle state and no other requests/grants are active).

The PCI bus 82 is "parked" on a PCI master when the bus 82 is idle to prevent floating signals on the PCI bus 82. During an idle period, the PCI bus arbiter 68 asserts a PCI master GNT signal even though the PCI master is not requesting the bus 82. In turn, the PCI master turns on its output drivers, which prevents the bus 82 from floating.

The integrated PCI bus arbiter 68 arbitrates between the PCI host bridge 18 and up to five external masters, connected to the PCI bus 82. (When the PCI host bridge 18 is the master of the PCI bus 82, the processor 36 has control of the bus 82.) The REQ/GNT signal pair for the PCI host bridge 18 is internally connected to the PCI bus arbiter 68. Five external REQIGNT pins (REQ 4–REQ 0, GNT 4–GNT 0) are provided to connect external PCI masters to the PCI bus arbiter 68.

The PCI Bus Specification states that the central arbiter must implement a fairness algorithm. This means that each potential bus master must be granted access to the bus independent of other requests. In the disclosed embodiment, the PCI bus arbiter satisfies this requirement by implementing a rotating priority arbitration scheme. This guarantees each bus master a place in the arbitration rotation.

Rotating priority mode alone may not provide adequate arbitration in a system where it is known that some PCI bus masters require more bandwidth than others. Therefore, the PCI bus arbiter 68 of the disclosed embodiment has two rotating priority queues to accommodate this requirement: a high-priority queue and a low-priority queue. The masters in the high-priority queue are granted more bandwidth than masters in the low-priority queue. The high-priority queue may contain up to two PCI masters in one embodiment, and the low-priority queue contains all masters that are not in the high-priority queue. Both queues have rotating priority, and one low-priority master is granted the PCI bus 82 for every rotation of the high-priority queue. After the low-priority master is granted the bus 82, the low-priority queue rotates to the next low-priority master. Any of the PCI bus masters of the microcontroller M or none at all may be placed in the high-priority queue.

The third bus shown in FIG. 9, the general purpose bus 72, is the subject of neither the processor bus arbiter 66, which arbitrates between requests for the processor bus 76, nor the PCI bus arbiter 68, which arbitrates between requests for the PCI bus 82. Instead, in one embodiment, the general purpose bus DMA controller 22 acts as the bus master for the general purpose bus 72. The general purpose DMA controller 22 handles DMA transactions between peripheral devices connected to the general purpose bus 72 and memory with minimal intervention by the processor 36.

Figure 10:
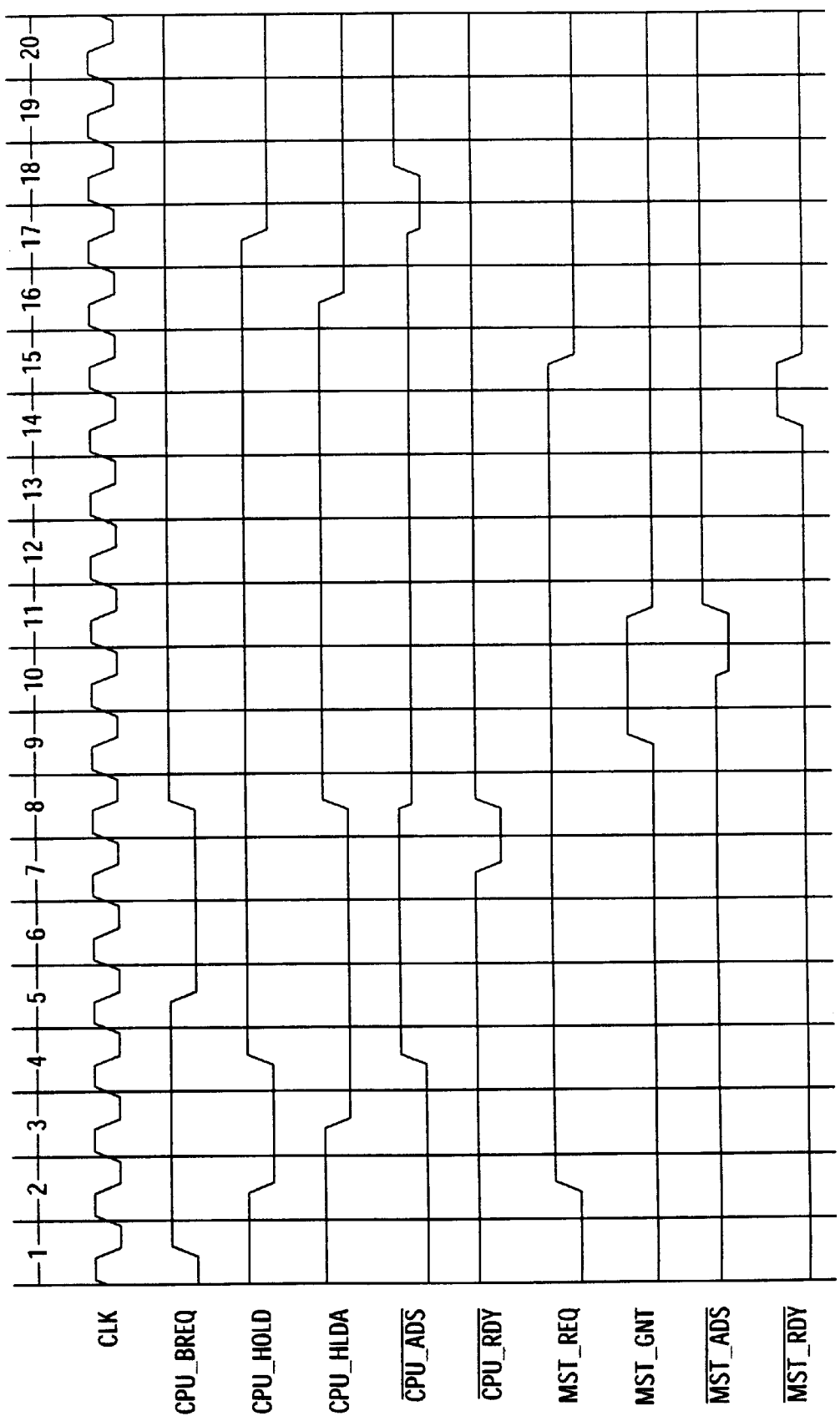
FIG. 10 is a timing diagram illustrating how the processor bus arbitration works for the microcontroller of FIG. 1 according to one embodiment.

FIG. 10 is a timing diagram illustrating the processor bus arbitration scheme of the microcontroller M of the illustrative system. At the top of FIG. 10, clock pulse signal CLK is shown. In the disclosed embodiment, the system arbitrator 26 receives a 33 MHz clock as an input. In this example, the processor bus arbitration is between two competing masters of the processor bus 76.

At the first clock cycle, the processor 36 requests the processor bus 76 by asserting CPU_BREQ. Note that during this clock cycle, the processor bus 76 is granted to some other master. This is evident because the CPU_HLDA signal is shown asserted. At the second clock cycle, the CPU bus arbiter 66 samples the request of the processor 36, CPU-BREQ, and begins arbitration. The CPU bus arbiter 66 determines that the processor bus 76 is free, and the processor 36 is the next master to receive the processor bus 76. Accordingly, the CPU bus arbiter 66 deasserts CPU_HOLD to the processor 36. (If the processor bus 76 was not free or the processor 36 was not the next master to receive the processor bus 76, then CPU_HOLD to the processor 36 instead remains asserted.) In this example, another processor bus master also requests the bus by asserting MST_REQ, as shown in FIG. 10. In the disclosed embodiment, as explained above, the other requesting masters of the processor bus 76 may be the general purpose DMA controller 22 or the PCI host bridge 18.

FIG. 10 shows that during the third clock cycle, the processor 36 samples CPU_HOLD deasserted and deasserts CPU_HLDA to take ownership of the processor bus 76. The processor 36 begins a cycle by asserting CPU_ADS, shown in the fourth clock cycle.

The CPU bus arbiter 66 samples CPU_ADS asserted and rearbitrates. The CPU bus arbiter 66 determines that the bus is granted to another master when the current cycle is done. Thus, the CPU bus arbiter 66 asserts CPU_HOLD to the processor 36. The processor 36 maintains ownership of the processor bus 76 until the processor deasserts CPU_HLDA. CPU_HLDA is shown Reasserted at clock cycle eight in FIG. 10.

Also during the eighth clock cycle, the processor 36 samples CPU_RDY asserted, which ends the current cycle. The processor 36 has also sampled CPU_HOLD asserted and surrenders the bus by asserting CPU_HLDA. The processor 36 has another cycle pending so it asserts CPU_BREQ to request access to the processor bus 76.

At the ninth clock cycle, the CPU bus arbiter 66 samples CPU_HLDA asserted from the processor 36. The CPU bus arbiter 66 then grants the processor bus 76 to the CPU bus master (the next master in the queue) by asserting MST_GNT to the CPU bus master. At clock ten, the CPU bus master samples MST_GNT asserted and begins a cycle by asserting MST_ADS.

At clock eleven, the CPU bus arbiter 66 samples MST_ADS asserted and rearbitrates. The CPU bus arbiter 66 determines that the processor bus 76 is granted to the processor 36 when the current cycle is done. Accordingly, the CPU bus arbiter 66 deasserts MST_GNT to the CPU bus master. The CPU bus master maintains ownership of the processor bus 76 until it deasserts MST_REQ.

At clock fifteen, the CPU bus master samples MST_RDY asserted, which ends the current cycle. The CPU bus master also samples MST_GNT deasserted and surrenders the processor bus 76 by deasserting MST_REQ. At clock 16, the CPU bus arbiter 66 samples MST_GNT deasserted from the CPU bus master and grants the processor bus 76 to the processor 36 by deasserting CPU_HOLD. Thus, FIG. 10 shows a timing diagram to illustrate for bus arbitration of the processor bus 76 between the processor 36 and another master for the microcontroller M.

Figure 11:
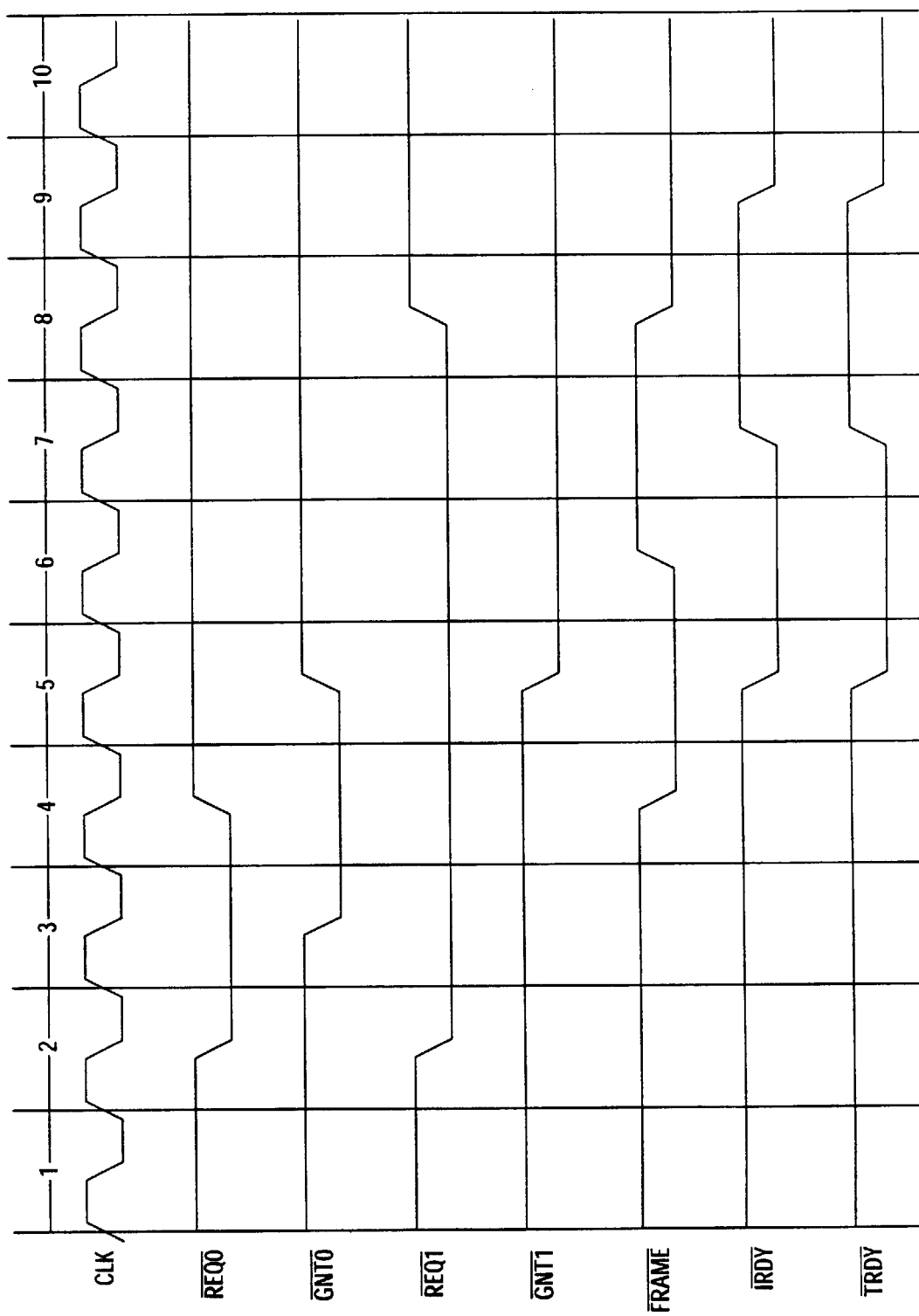
FIG. 11 is a timing diagram illustrating how the PCI bus arbitration works for the microcontroller of FIG. 1 according to one embodiment.

FIG. 11 is a timing diagram illustrating how the PCI bus arbiter 68 of the microcontroller M arbitrates between two masters. Although there are only two PCI masters in this example, the mechanism is the same when there are more PCI masters. When additional masters are competing for use of the PCI bus 82, more REQ/GNT signal pairs and more than one PCI bus transaction could take place before an individual PCI master is granted the bus.

As with FIG. 10, the clock signal CLK is shown at the top of FIG. 11. As with the CPU bus arbiter 66, the PCI bus arbiter 68 accepts a 33 MHz clock as an input. At the second clock cycle, a first PCI master, designated as master0, and a second PCI master, designated as master1, simultaneously requests access to the PCI bus 82. At clock number three, the PCI bus arbiter 68 samples REQ0 asserted and begins arbitration. Master0 has higher priority at this time than master1, so the PCI bus arbiter 68 grants the PCI bus 82 to master0. At clock four, master0 samples the bus idle (when both FRAME# and IRDY# are deasserted) and the GNT0 signal asserted and begins a transaction by asserting FRAME#. Master0 now becomes the lowest priority master in the rotating priority queue.

At clock number five, the PCI bus arbiter 68 detects that a transaction has started and rearbitrates for the next master. The second requesting master, master1, is now the highest priority master in the rotating priority queue. Accordingly, the PCI bus arbiter 68 deasserts the GNT0 for master0 and asserts the GNT1 signal for master 1. At clock number eight, as FIG. 11 shows, master1 samples the bus idle (when both FRAME# and IRDY# are deasserted) and the GNT1 signal asserted. Master1 then begins a transaction by asserting FRAME#. Master1 now becomes the lowest priority master in the rotating priority queue.

At clock number nine, no other masters are requesting the bus. Thus, the PCI bus arbiter 68 keeps asserting the GNT1 for master 1. This allows master1 to continue the transaction even after its master latency timer has expired. If another master were requesting the PCI bus 82, the PCI bus arbiter 68 would rearbitrate, deassert the GNT1 signal for master1 and assert the GNT signal for the next master to be granted the PCI bus 82. Thus, FIG. 11 shows how the PCI bus arbiter 68 arbitrates between two masters according to one embodiment. Those skilled in the art will appreciate that a variety of arbitration schemes are possible.

Thus, a microcontroller providing a flexible architecture to support both general embedded and communications applications is disclosed. The microcontroller supports both a relatively low-speed bus and a relatively high-speed bus such as a PCI bus. Further, the microcontroller provides both a memory controller for coupling to DRAM and a ROM controller for coupling to external ROM devices of an assorted variety. The microcontroller includes arbiters for arbitrating between devices seeking control of both the processor bus and the PCI bus. The microcontroller further is designed to generate all of its internal and system clocks.

Figure 12:
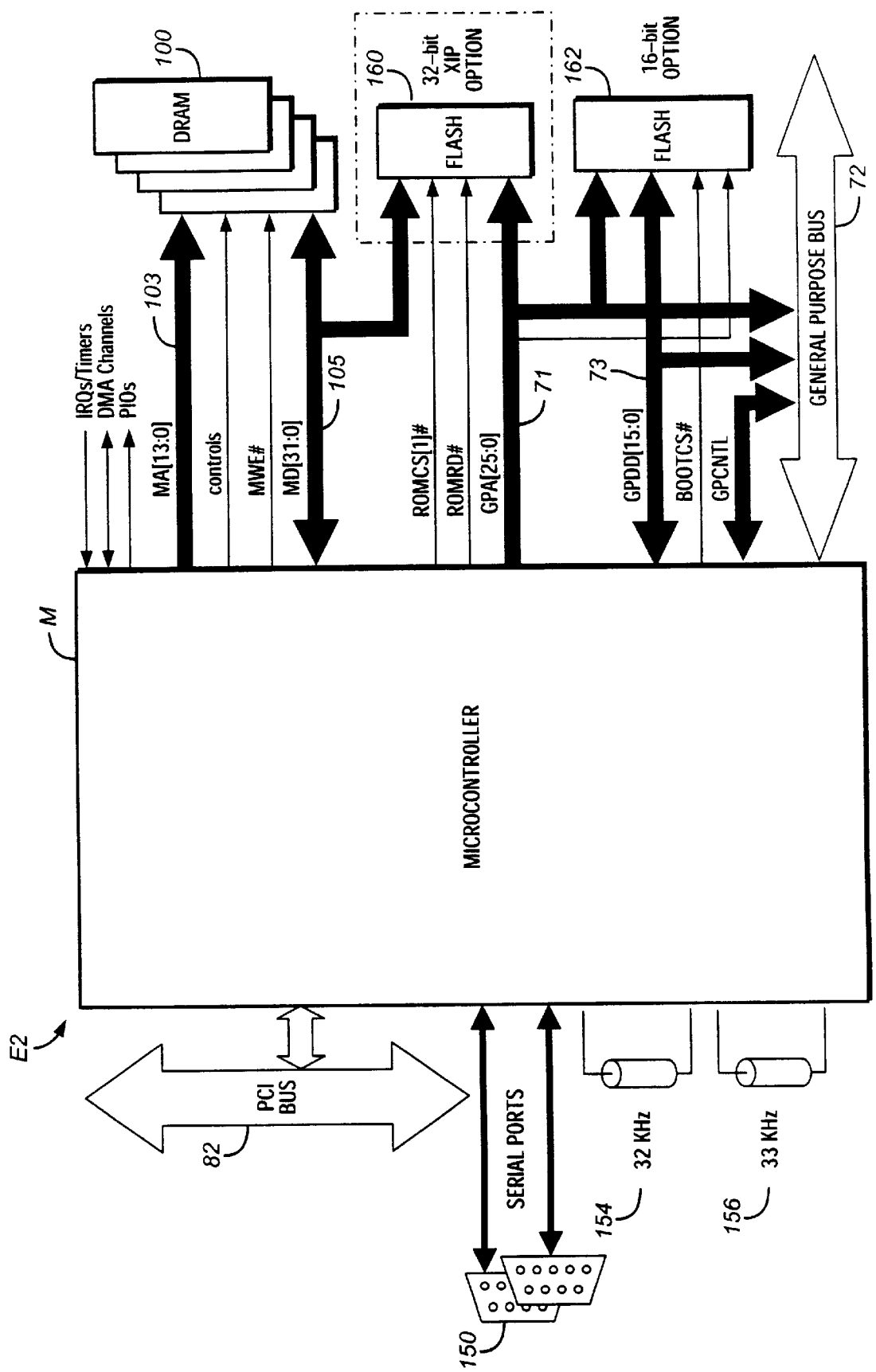
FIG. 12 is a block diagram of an embedded system using the microcontroller of FIG. 1 according to one embodiment.

FIG. 12 is a block diagram of an embedded system E2 which illustrates many of the features of the microcontroller M. The figure shows that a flash ROM 160, which is a 32-bit ROM array used for execution-in-place, may be coupled to the microcontroller M using the DRAM data bus 105. Also shown is a 16-bit option flash ROM 162 which is coupled to the microcontroller M using the general purpose data bus 73.

Also coupled to the microcontroller M is DRAM 100, which, in this configuration, shares the DRAM data bus 105 with the flash ROM 160. The microcontroller M further provides pins as outputs from the UARTs 40 (see FIG. 1) such that serial ports 150 may be coupled thereto. A PCI bus 82 is also shown in FIG. 12, offering the opportunity to add several high-speed peripheral components to the embedded system E2.

Figure 13:
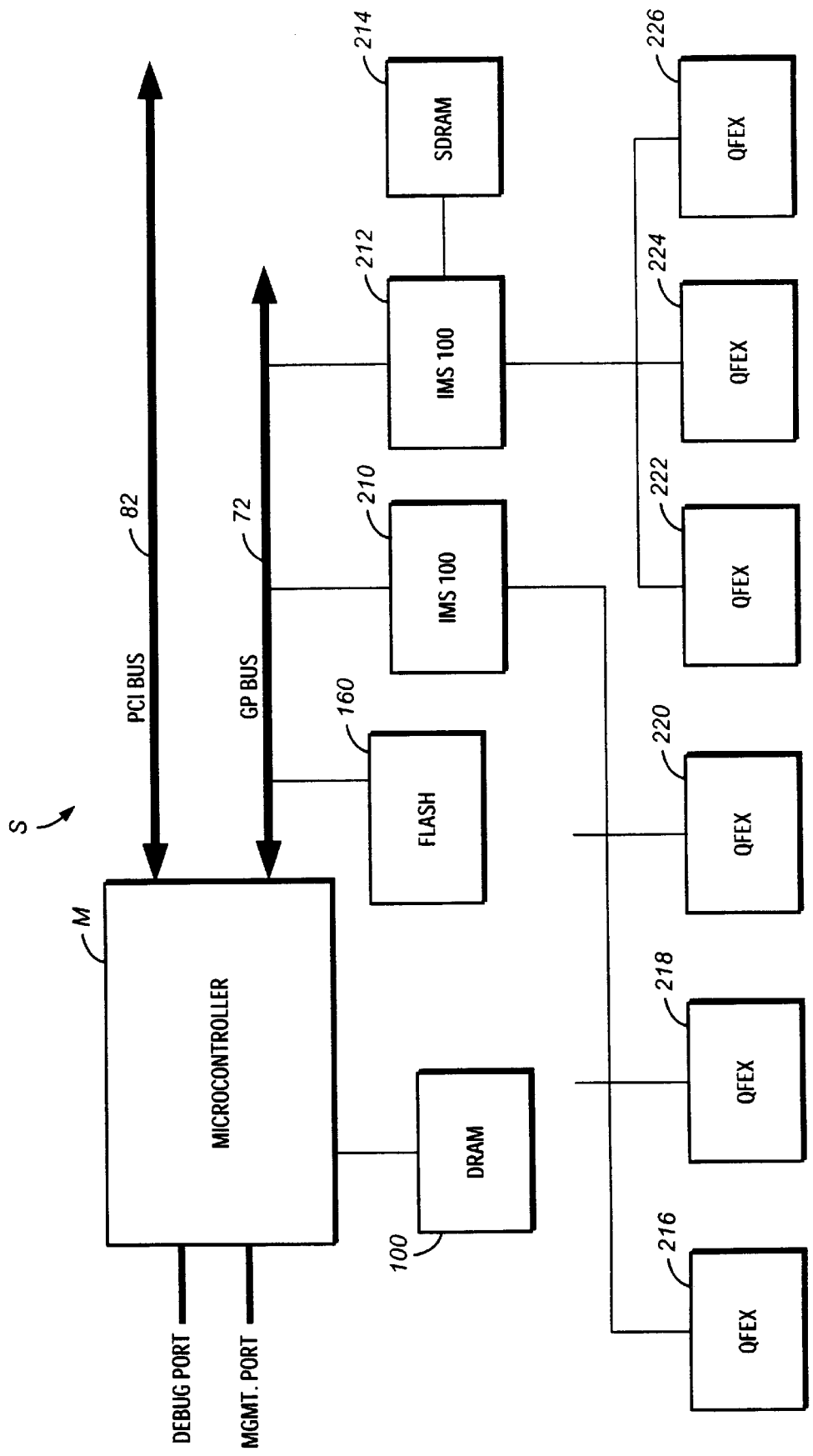
FIG. 13 is a block diagram of an exemplary switch including the microcontroller of FIG. 1

FIG. 13 is a block diagram of an exemplary switch S including the microcontroller M of FIG. 1. The 24-port Ethernet layer 2 switch S includes two AMD IMS 10/100 switch chips 210 and 212, coupled to the general purpose bus 72, for controlling the switch S. Additionally, a plurality of QFEX chips 216 each provide an interface to one or more hardware ports. The switch S also includes an RS232 debug port and an RS232 configuration/management port.

Figure 14:
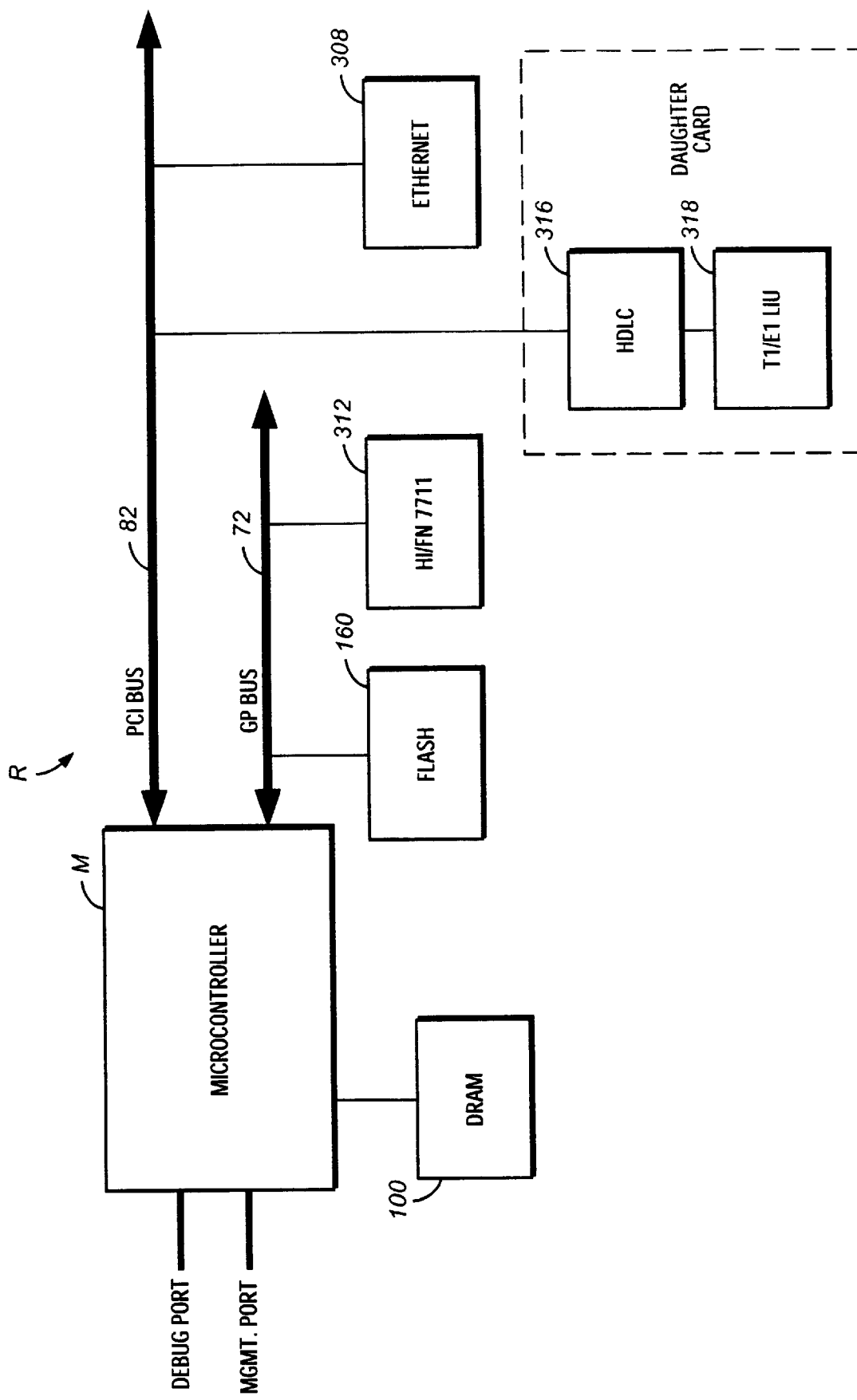
FIG. 14 is a block diagram of an exemplary router including the microcontroller of FIG. 1.

Next, FIG. 14 is a block diagram of an exemplary router R using the microcontroller M of FIG. 1. The router R may be used in both local area network, or LAN, or wide area network, or WAN, environments. As with the implementations illustrated in FIGS. 12 and 13, the microcontroller M is coupled to DRAM 100 and provides both the general purpose bus 72 and the PCI bus 82 externally. The router R includes a daughter card 314 for a WAN interface, such as a digital subscriber line, or DSL, coupled to the PCI bus 82. The daughter card 314 is made up of both a single channel high-level data link control, or HDLC, controller 316, and a T1/E1 LIU chip 318, which provides an interface to a wide-area network. An Ethernet controller 308, such as the AMD PCI 1/10/100 Ethernet controller, is also shown coupled to the high-performance PCI bus 82 to provide a local-area network interface. An HI/FN 7711 card 312 is shown connected to the general purpose bus 72 to provide compression and encryption. As with the switch S of FIG. 13, the router R includes a debug port and a management port. Both the general purpose bus 72 and the PCI bus 82 of the microcontroller M are exploited to produce the router R. Network hardware designers as well as embedded system designers of other technologies will recognize that the microcontroller M may be used for other devices in addition to the switch S and router R of FIGS. 13 and 14. Further, it should be understood that an embedded system may provide communication-oriented peripherals or cores externally coupled to a PCI bus or general purpose bus of the microcontroller M.

Thus, the microcontroller M provides a powerful tool, both for microprocessor-based systems, such as the personal computer market, and for embedded system designers. Particularly for the communications market, the high-speed bus offers a wide variety of connectivity options. Multiple ROM devices of varying capability may be coupled to the microcontroller M, for flexible firmware capability. The integrated general purpose peripheral components readily enable personal computer applications to be realized without losing the compatibility to run common software and hardware applications. Further, the internal peripheral components may, alone or coupled with external peripheral devices, be exploited for other, non-personal computer applications.

The foregoing disclosure and description of the various embodiments are illustrative and explanatory thereof, and various changes in the descriptions of the microcontroller and other circuitry, the organization of the components, and the order and timing of steps taken, as well as in the details of the illustrated system may be made without departing from the spirit of the invention.

We claim:

1. A microcontroller, comprising:
   a processor bus;
   an embedded processor coupled to the processor bus;
   a primary memory controller coupled to the processor bus;
   a relatively high-speed peripheral bus host bridge coupled to the processor bus;
   a relatively high-speed peripheral bus coupled to the relatively high-speed peripheral bus host bridge;
   a relatively low-speed general purpose peripheral bus controller coupled to the processor bus;
   a relatively low-speed general purpose peripheral bus coupled to the relatively lowspeed general purpose peripheral bus controller;
   a plurality of integrated general purpose peripherals coupled to the relatively lowspeed general purpose peripheral bus; and
   a secondary memory controller coupled to the processor bus.

2. The microcontroller of claim 1, further comprising:
   a relatively high-speed peripheral bus arbiter coupled to the relatively high-speed peripheral bus host bridge; and
   a processor arbiter coupled to the embedded processor.

3. The microcontroller of claim 1, wherein the relatively high-speed peripheral bus is effectively compliant with a peripheral component interconnect (PCI) bus.

4. The microcontroller of claim 1, wherein the primary memory controller comprises a dynamic random access memory (DRAM) controller and the secondary memory controller comprises a read only memory (ROM) controller.

5. The microcontroller of claim 1, further comprising:
   an internal oscillator to supply a first clock for the embedded processor, a second clock for the relatively high-speed peripheral bus, and a third clock for the primary memory controller.

6. The microcontroller of claim 1, wherein the relatively high-speed peripheral bus comprises a 32-bit bus and the relatively low-speed general purpose peripheral bus comprises an 8/16-bit bus.

7. The microcontroller of claim 1, further comprising:
   a general purpose peripheral bus direct memory access controller coupled to the relatively low-speed general purpose peripheral bus and the processor bus.

8. The microcontroller of claim 1, wherein the relatively low-speed general purpose peripheral bus comprises a general purpose data bus selectively shared by the secondary memory controller, and a primary memory data bus coupled to the primary memory controller is selectively shared by the secondary memory controller.

9. An embedded system, comprising:
   a microcontroller, comprising:
      a processor bus;
      an embedded processor coupled to the processor bus;
      a primary memory controller coupled to the processor bus;
      a relatively high-speed peripheral bus host bridge coupled to the processor bus;
      an internal relatively high-speed peripheral bus coupled to the relatively high-speed peripheral bus host bridge;
      a relatively low-speed general purpose peripheral bus controller coupled to the processor bus;
      an internal relatively low-speed general purpose peripheral bus coupled to the relatively low-speed general purpose peripheral bus controller;
      a plurality of integrated general purpose peripherals coupled to the relatively low-speed general purpose peripheral bus; and
      a secondary memory controller coupled to the processor bus;
   a primary memory coupled to the primary memory controller;
   an external relatively low-speed general purpose peripheral bus coupled to the relatively low-speed general purpose peripheral bus controller; and an external relatively high-speed peripheral bus coupled to the relatively high-speed peripheral bus host bridge.

10. The embedded system of claim 9, further comprising:

a plurality of communication-oriented peripherals coupled to either the external relatively low-speed general purpose peripheral bus or the external relatively high-speed peripheral bus.

11. The embedded system of claim 9, the microcontroller further comprising:

a relatively high-speed peripheral bus arbiter coupled to the relatively high-speed peripheral bus host bridge; and a processor arbiter coupled to the embedded processor.

12. The embedded system of claim 9, wherein the internal relatively high-speed peripheral bus is effectively compliant with a peripheral component interconnect (PCI) bus.

13. The embedded system of claim 9, wherein the primary memory controller comprises a dynamic random access memory (DRAM) controller and the secondary memory controller comprises a read only memory (ROM) controller.

14. The embedded system of claim 9, the microcontroller further comprising:

an internal oscillator to supply a first clock for the embedded processor, a second clock for the internal relatively high-speed peripheral bus, and a third clock for the primary memory controller.

15. The embedded system of claim 9, wherein the internal relatively high-speed peripheral bus comprises a 32-bit bus, the internal relatively low-speed general purpose bus comprises an 8/16-bit bus, the external relatively high-speed peripheral bus comprises a 32-bit bus, and the external relatively low-speed general purpose peripheral bus comprises an 8/16bit bus.

16. The embedded system of claim 9, the microcontroller further comprising:

a general purpose peripheral bus direct memory access controller coupled to the internal relatively low-speed general purpose peripheral bus and the processor bus.

17. The embedded system of claim 9, wherein the internal relatively low-speed general purpose peripheral bus comprises a general purpose data bus selectively shared by the secondary memory controller, and a primary memory data bus coupled to the primary memory controller is selectively shared by the secondary memory controller.

18. A microcontroller, comprising:

an embedded processor;

a processor bus means for communicating with the embedded processor;

a primary memory controller means for communicating with an external primary memory, the primary memory controller means being coupled to the processor bus means;

a relatively high-speed peripheral bus means for handling communication with a plurality of external relatively high-speed peripherals;

a relatively high-speed peripheral bus host bridge means for handling communication between the relatively high-speed peripheral bus means and the processor bus means;

a plurality of integrated general purpose peripherals;

a relatively low-speed general purpose peripheral bus means for communicating with the plurality of integrated general purpose peripherals;

a relatively low-speed general purpose peripheral bus controller means for communicating with the relatively low-speed general purpose peripheral bus means, the relatively low-speed general purpose peripheral bus controller means being coupled to the processor bus means; and a secondary memory controller means for communicating with an external secondary memory, the secondary memory controller means being coupled to the processor bus means.

19. The microcontroller of claim 18, further comprising:

a relatively high-speed peripheral bus arbiter means for handling arbitration for the relatively high-speed peripheral bus means; and a processor arbiter means for handling arbitration for the processor bus means.

20. The microcontroller of claim 18, further comprising:

a general purpose peripheral bus direct memory access controller means for handling direct memory access transactions for the relatively low-speed general purpose peripheral bus.

* * * * *

UNITED STATES PATENT AND TRADEMARK OFFICE
CERTIFICATE OF CORRECTION

PATENT NO. : 6,415,348 B1  Page 1 of 1
DATED : July 2, 2002
INVENTOR(S) : James O. Mergard et al.

It is certified that error appears in the above-identified patent and that said Letters Patent is hereby corrected as shown below:

<u>Column 18,</u>
Lines 2 and 5, please replace "...relatively lowspeed..." with -- ...relatively low-speed... --

Signed and Sealed this

Twenty-eighth Day of January, 2003

JAMES E. ROGAN
*Director of the United States Patent and Trademark Office*